(12) United States Patent
Ostojich

(10) Patent No.: US 12,329,296 B2
(45) Date of Patent: Jun. 17, 2025

(54) FOOD STAND SYSTEM

(71) Applicant: Jasna Ostojich, Park Ridge, IL (US)

(72) Inventor: Jasna Ostojich, Park Ridge, IL (US)

( * ) Notice: Subject to any disclaimer, the term of this patent is extended or adjusted under 35 U.S.C. 154(b) by 1056 days.

(21) Appl. No.: 17/032,427

(22) Filed: Sep. 25, 2020

(65) Prior Publication Data

US 2021/0015275 A1 Jan. 21, 2021

Related U.S. Application Data

(63) Continuation-in-part of application No. 16/012,878, filed on Jun. 20, 2018, now Pat. No. 10,820,726.

(51) Int. Cl.
| | |
|---|---|
| A47F 10/06 | (2006.01) |
| A47J 27/00 | (2006.01) |
| E04H 1/12 | (2006.01) |
| E04H 3/04 | (2006.01) |
| F25D 29/00 | (2006.01) |
| G06Q 30/0601 | (2023.01) |
| G06Q 50/12 | (2012.01) |
| A47F 9/04 | (2006.01) |

(52) U.S. Cl.
CPC ............ *A47F 10/06* (2013.01); *A47J 27/002* (2013.01); *A47J 27/004* (2013.01); *E04H 1/1222* (2013.01); *E04H 3/04* (2013.01); *F25D 29/003* (2013.01); *G06Q 30/0633* (2013.01); *G06Q 50/12* (2013.01); *A47F 9/04* (2013.01)

(58) Field of Classification Search
CPC ...... A47F 10/06; A47F 9/04; A47F 2010/065; A47J 27/002; A47J 27/004; E04H 1/1222; E04H 3/04; F25D 29/003; G06Q 20/145; G06Q 20/18; G06Q 20/20; G06Q 30/0635; G06Q 50/12; G07F 9/10; G07F 17/0064; A47B 77/08; A47B 77/02; G07G 1/0018; G07G 1/0036
USPC .................................................. 700/236, 241
See application file for complete search history.

(56) References Cited

U.S. PATENT DOCUMENTS

| | | | | |
|---|---|---|---|---|
| 2,815,539 | A | * 12/1957 | Schneider | ............ E04B 1/3465 52/64 |
| 2,867,853 | A | 1/1959 | Lindgren | |
| 3,437,057 | A | * 4/1969 | Wulff | ..................... A47G 23/08 211/1.52 |
| D236,925 | S | * 9/1975 | Clark | ........................... D6/650 |

(Continued)

FOREIGN PATENT DOCUMENTS

WO 0191622 A1 12/2001

OTHER PUBLICATIONS

"Round Mobile Phone Kiosk," Mykioskey, Accessible at: www.mykioskey.com/project/mobile-phone-kiosk, Accessed: Jan. 1, 2018.

(Continued)

*Primary Examiner* — Jeffrey A Shapiro
(74) *Attorney, Agent, or Firm* — Gearhart Law, LLC

(57) ABSTRACT

A food stand system with a plan view in the shape of an incomplete circle, with a flat top surface as a countertop, and a convex customer-facing surface. The stand contains a food preparation appliance having both cooking and refrigeration components. Sensors measure the appliance interior state, and provide data to an automated controller that controls appliance operation to prepare food for consumption.

10 Claims, 39 Drawing Sheets

(56) References Cited

U.S. PATENT DOCUMENTS

| | | | |
|---|---|---|---|
| 3,953,091 A * | 4/1976 | Shults | A47F 10/06 312/239 |
| 4,007,810 A | 2/1977 | Weddendorf | |
| 4,114,541 A | 9/1978 | Weddendorf | |
| 4,546,578 A | 10/1985 | Behrmann | |
| 5,383,703 A | 1/1995 | Irvine, III | |
| D367,970 S * | 3/1996 | Rhoads | D6/699 |
| 5,727,352 A * | 3/1998 | Bared | E04H 14/00 52/36.2 |
| 5,775,033 A * | 7/1998 | Meehan | E04H 3/04 52/33 |
| 5,938,261 A | 8/1999 | Faba | |
| 6,158,174 A | 12/2000 | Mairs | |
| 6,189,944 B1 * | 2/2001 | Piche | B60P 3/0257 296/22 |
| 6,416,101 B1 | 7/2002 | Bartch | |
| 6,997,495 B1 | 2/2006 | Groezinger | |
| 7,172,231 B1 | 2/2007 | Johnson, II | |
| D684,791 S * | 6/2013 | Campioni | D6/686 |
| 8,931,400 B1 | 1/2015 | Allen | |
| D733,005 S | 6/2015 | Erwin | |
| 9,328,957 B1 | 5/2016 | Feinstein | |
| 10,507,755 B1 * | 12/2019 | Clark | B60R 15/04 |
| 10,820,726 B2 | 11/2020 | Ostojich | |
| 11,244,299 B1 * | 2/2022 | Pittack | G06Q 20/3224 |
| 2003/0183456 A1 * | 10/2003 | Hatzor | G07F 9/105 186/39 |
| 2004/0249497 A1 * | 12/2004 | Saigh | E04H 14/00 700/216 |
| 2005/0103321 A1 | 5/2005 | Wishart | |
| 2007/0267950 A1 * | 11/2007 | Hartsfield | A47F 9/00 312/140.1 |
| 2007/0278766 A1 | 12/2007 | Schneider et al. | |
| 2010/0034935 A1 | 2/2010 | Wally et al. | |
| 2012/0146363 A1 | 6/2012 | Fiander et al. | |
| 2012/0325198 A1 | 12/2012 | Bacigalupo | |
| 2013/0033057 A1 | 2/2013 | Markham | |
| 2014/0136366 A1 * | 5/2014 | Carroll | G06Q 30/0633 705/26.8 |
| 2014/0300087 A1 | 10/2014 | Bell | |
| 2014/0360381 A1 * | 12/2014 | Wiker | A21B 1/40 99/331 |
| 2015/0081798 A1 * | 3/2015 | Lee | H04L 67/562 709/205 |
| 2015/0379531 A1 | 12/2015 | Christian et al. | |
| 2018/0240183 A1 * | 8/2018 | Tiilikainen | G06Q 10/087 |
| 2018/0274256 A1 | 9/2018 | El-Wakeel et al. | |
| 2019/0387901 A1 | 12/2019 | Ostojich | |
| 2020/0093327 A1 * | 3/2020 | Hua | A23L 5/10 |
| 2020/0367668 A1 | 11/2020 | Ostojich | |
| 2021/0015275 A1 | 1/2021 | Ostojich | |
| 2021/0090017 A1 * | 3/2021 | Reiss | G06Q 10/0833 |

OTHER PUBLICATIONS

"Fruit shape fiberglass street mobile kitchen service cart food kiosks for sale," Aliexpress, Accessible at: www.aliexpress.com/item/32812065564.html, Accessed: Jan. 1, 2018.

* cited by examiner

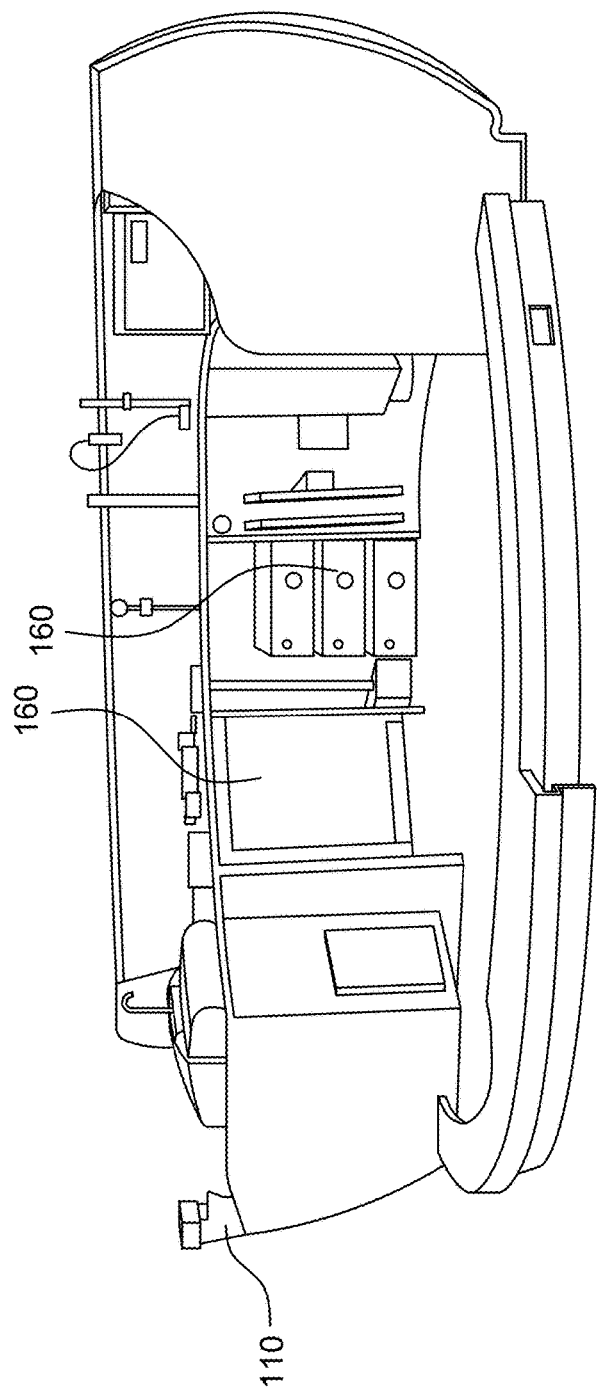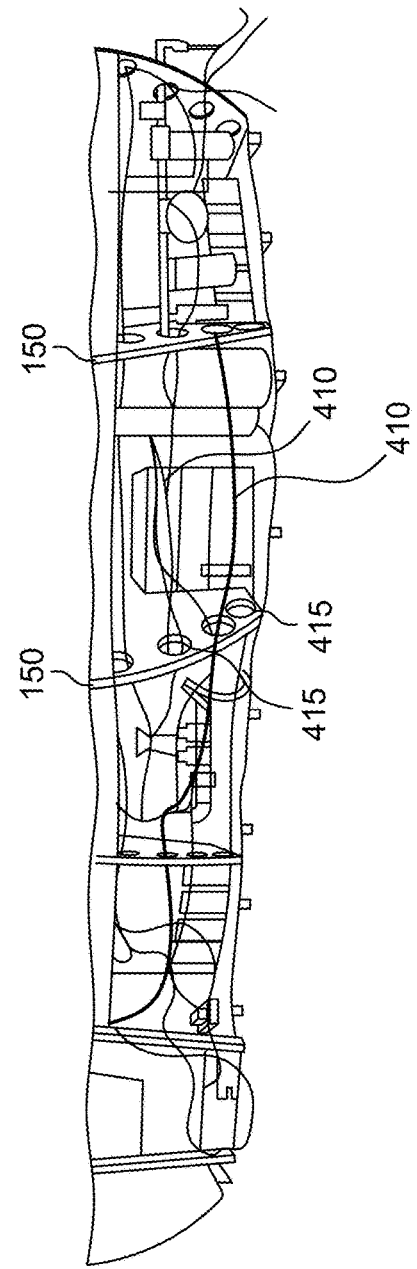
FIG. 4A
FIG. 4B

FOOD STAND SYSTEM

CROSS-REFERENCE TO RELATED APPLICATION

This application is a United States Continuation-in-Part Non-Provisional patent application that claims priority to U.S. Non-Provisional patent application Ser. No. 16/012,878, filed on Jun. 20, 2018, the entire contents of which are hereby incorporated by reference in their entirety.

FIELD OF THE EMBODIMENTS

This invention relates to food stands and, in particular, to a food stand system with enhanced operational and management features.

BACKGROUND

Food stands are commonly used to provide food, beverages, desserts, and other fare at events such as outdoor celebrations, block parties, and the like. Typically, stands are set up in an ad hoc manner. They are individually placed, provisioned, and operated, often one day at a time, at one event at a time. As such, there are ample opportunities to improve many aspects of managing and operating food stands.

SUMMARY OF THE EMBODIMENTS

This invention relates to food stands and, in particular, to a food stand system with enhanced operational and management features.

A first embodiment of the present invention describes a food stand system. The food stand system includes a support structure with a semicircular plan view having two ends, with a flat top surface as a countertop, a bottom, and a front surface permanently coupled therebetween defining a convex customer-facing surface (outside) and a concave server-facing surface (inside). The space defined by the top, bottom, and front of the support structure defines a compartment. The semicircular support structure is configured to be separable into two parts along a vertical plane.

The food stand system also includes a serving bar having two ends, each end removably attached to one of the two parts of the support structure. The serving bar is one of a plurality of serving bars, each configured to be used for a different respective type of event. The food stand system further includes a vertical brace attached to each respective end forming an end surface disposed between the bottom of the support structure and the countertop and a food preparation appliance disposed within the compartment. The food stand system additionally includes a sensor coupled to the food preparation appliance. The sensor is operative to measure, as sensed data, a physical characteristic of the appliance or of food prepared using the appliance. Additionally, the food stand system includes a processor operatively coupled to the sensor and configured to process the sensed data in accordance with instructions stored in a tangible data storage device in data communication with the processor. The instructions define a procedure using the sensed data for preparing food using the appliance.

The food stand system further includes a heating component and a cooling component within the food preparation appliance, arranged to apply a range of temperatures to food prepared in the appliance. In other examples, the food stand system includes: a platform coupled to the bottom of the support structure, an enclosure coupled to the platform defining a space surrounding the support structure, a door mounted to the enclosure for entering and exiting the space, and a power source disposed inside the platform and arranged to provide power to the appliance.

The power source comprises an internal power source or an external power source. In examples, the internal power source includes: a fuel cell that generates power, a battery, a solar power source, a gas power source, a diesel power source, a natural gas power source, or a propane power source. In other examples, the external power source comprises an electric utility company in a fixed location or a temporary location. The food stand system also includes instructions stored in the data storage device defining an energy management procedure for operating the power source and the appliance. The food stand system further includes a towable trailer removably coupled to the platform.

In further examples, the food stand system includes a portable kitchen. The portable kitchen includes: a cooking surface, a sink with running water, a refrigerator, the food preparation appliance, and instructions stored in the storage device. The instructions, when executed by the processor, manage the kitchen to provide food service on demand and/or may include food management software for food quality and control.

The food stand system may also include a back office server having a transceiver operatively coupled to a server processor and a server memory device and configured to send and receive data carrying signals to and from one or more parties interacting with the system. The server memory device stores instructions for generating data sent and processing data received. The processor is configured to generate data sent and process data received. The signals include data received from a customer device running a customer app that interacts with the system. The customer app includes routines for: creating a customer account on a communicatively coupled server, logging in and logging out of the customer account, updating customer-related information in the customer account, presenting a menu including food item prices, information, and options, presenting a food stand locator map and a food stand selector, providing interfaces for a shopping cart for holding food item selections, order payment, order status tracking, and order delivery tracking, and receiving order completion confirmation from seller.

In other examples, the signals include data received from a seller device running a seller app that interacts with the system. The seller app includes routines for: creating a seller account on the communicatively coupled server, logging in and logging out of the seller account, updating seller-related information in the seller account, receiving order information submitted by a customer, verifying receipt of payment for the order, sending a confirmation message to the customer, updating order status, and sending order pickup and delivery information to a delivery device. In further examples, the signals include data received from a delivery device running a delivery app that interacts with the system. The delivery app includes routines for: creating a deliverer account on the communicatively coupled server, logging in and logging out of the deliverer account, updating deliverer-related information in the deliverer account, receiving order delivery information including an order pickup location, a delivery location map, and an order delivery address and phone number, confirming the order recipient, sending a delivery completed message to the order recipient, and logging an amount of time between order pickup and delivery.

In additional examples, the back office server executes software including routines for: accessing all information; an on-site manager; providing limited access to at least one café; inventory; sales; receivables; stock; time card information; local menu updates; an API; advertisements management; beacon/adds manager; specials on the mobile device; a loyalty card; analytics; supplier notification of low inventory; order fulfillment; notifications to suppliers; data repository; generating reports; downloading all data as an Excel file; IP address; and menu control. The system also includes a hand washing station affixed to the food stand system via a slide-in/slide-out attachment mechanism.

A second embodiment of the present invention describes an all-in-one appliance. The all-in-one appliance includes a body component comprising: a first side disposed opposite a second side, a third side disposed opposite a fourth side, a fifth side disposed opposite a sixth side, and a hollow interior component configured to receive and house a food product therein. The first side includes a front door and the second side includes a rear door.

The all-in-one appliance also includes a controller component configured to program one or more components of the all-in-one appliance. The one or more components may include, among others, a freezer component, a refrigerator component, a warmer component, a humidifier component, an oven component, a steamer component, a holding component, and/or a serving component. The all-in-one appliance is an interlocking unit configured to engage horizontally or vertically another all-in-one appliance to form a stacked configuration.

The all-in-one appliance also includes one or more diagnostic sensors configured to detect a parameter of the one or more components exceeding a predefined limit. The parameter may be a temperature, a presence of smoke, a presence of carbon monoxide, a presence of carbon dioxide, a presence of water, a presence of water pressure, a presence of steam pressure, and/or a presence of pressure from a halocarbon product, among others. In examples, the controller component is controllable locally or remotely and wired or wirelessly using a computing device. Moreover, the controller component is further configured to capture data associated with the all-in-one appliance and transmit the data to a computing device and/or a server for storage. Optionally, an enabled smartphone can be used with all-in-one appliance allowing the customer to interact with the all-in-one appliance.

In some examples, the all-in-one appliance additionally includes a speaker component and/or a microphone configured to provide instructions to a customer when accessing the all-in-one appliance and allowing the customer to interact with the all-in-one appliance. In other examples, the all-in-one appliance includes a video camera for monitoring access to the front door and/or the rear door of the all-in-one appliance. In another example, the all-in-one appliance includes a monitoring component configured to monitor electrical components of the all-in-one appliance and UVC sterilization of components of the all-in-one appliance.

A third embodiment of the present invention describes a stacked configuration that includes a first all-in-one appliance stacked vertically or horizontally with a second all-in-one appliance. Components of each of the first all-in-one appliance and the second all-in-one appliance are independently controlled by a controller component.

BRIEF DESCRIPTION OF THE DRAWINGS

FIG. 4A depicts the service area of an exemplary food stand embodiment, according to at least some embodiments disclosed herein.

FIG. 4B depicts a cutaway view of wiring and piping for devices in an exemplary food stand similar to that shown in FIG. 4A, according to at least some embodiments disclosed herein.

DETAILED DESCRIPTION

Figure 1:
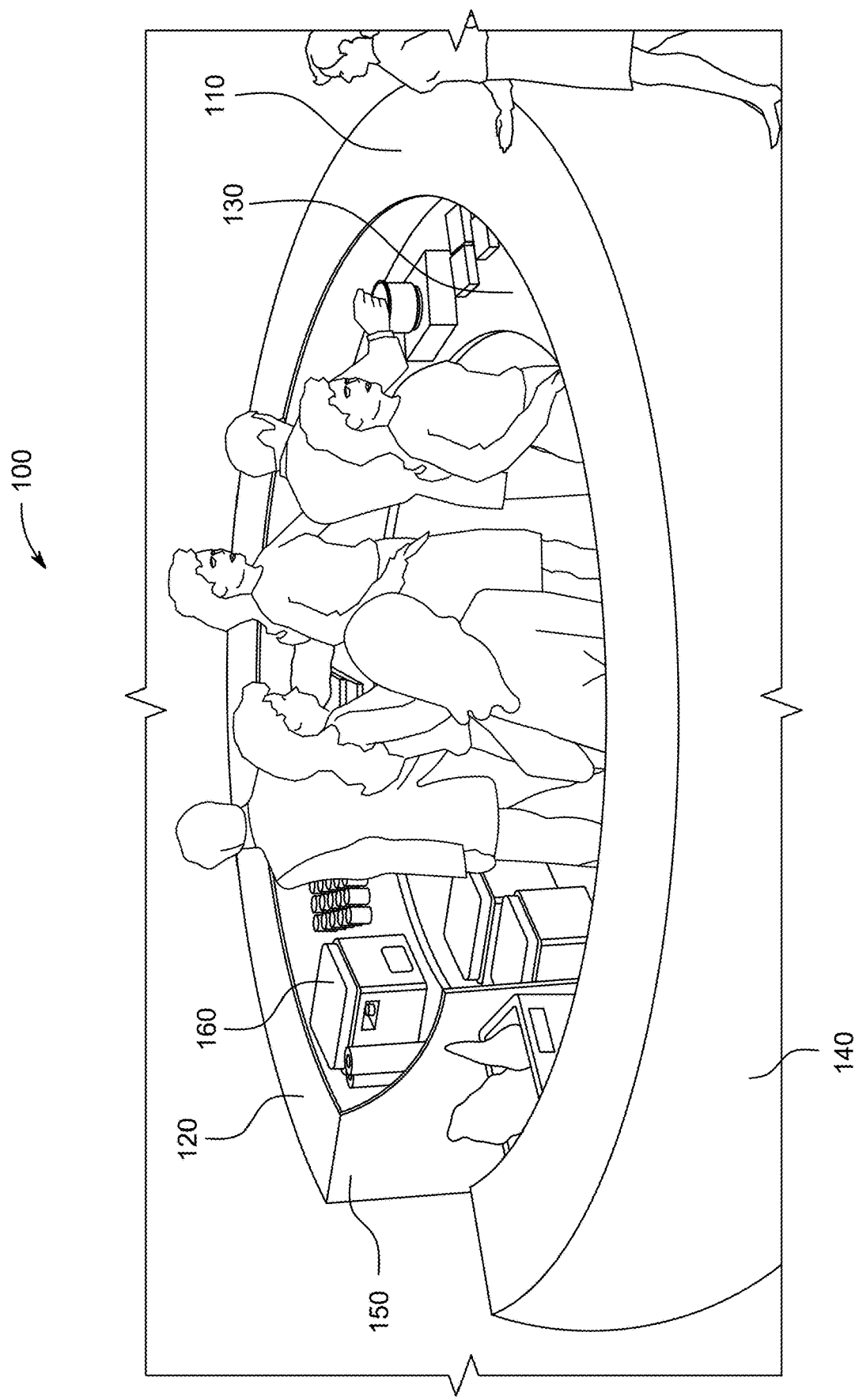
FIG. 1 depicts an exemplary embodiment of a food stand, according to at least some embodiments disclosed herein.

Aspects of exemplary embodiments of the claimed invention will now be described with reference to the drawings, in which identical elements have the same reference numerals. These embodiments are provided by way of explanation of the present invention, which is not intended to be limited thereto. Those of ordinary skill in the art may appreciate upon reading the present specification and viewing the present drawings that various modifications and variations can be made thereto. In addition, it is noted the disclosure pertains to embodiments that may include any of food stands, cafés, food kiosks, and the like. Unless the context indicates otherwise, the term "food stand" may be used herein to refer to any and all such embodiments.

FIG. 1 shows an exemplary embodiment of a food stand 100 in use at an outdoor function. As shown, servers are in the service area to take orders, process transactions, prepare the orders, provide the orders to the customers, and the like. The configuration shown includes a food stand with a support structure 110 having a circular plan with a gap through which servers can enter and exit. The top of the support structure is flat, and may be used as a countertop 120. A customer-facing "front" surface 140 may have a characteristic convex shape, and the corresponding server-facing "back" surface may have a concave surface. The support structure also has a bottom (not shown). The top, bottom, and back surface together define a compartment. A horizontal shelf 130 is disposed within the compartment adjacent to the back surface. A vertical brace 150 is attached to each end forming an end piece. One or more food preparation appliances 160 may be disposed within the compartment, either sitting on top of the shelf or underneath it. The appliance(s) 160 are each equipped with a sensor (not shown in FIG. 1) operative to measure at least one physical characteristic of the appliance or of food prepared therein. A processor operatively coupled to the sensor executes a procedure using sensed data, such as for directing and managing food preparation using the appliance.

In an embodiment, the food preparation appliance may comprise both a heating component and a cooling component, operatively coupled to sensors that are communicatively coupled to controller components. These may be arranged to provide a large range of temperatures and perform a plurality of functions pertaining to food preparation, including complete temperature management, initiation times, durations, and the like, all of which may be programmed. Controlled and programmed temperatures may include achieving and maintaining freezing, refrigerating, defrosting, cooking, retherming, and holding at a predetermined temperature. These may be used to take frozen food from frozen to ready-to-eat, and may also be used to chill and freeze already cooked or ready-to-eat food.

Figure 2A:
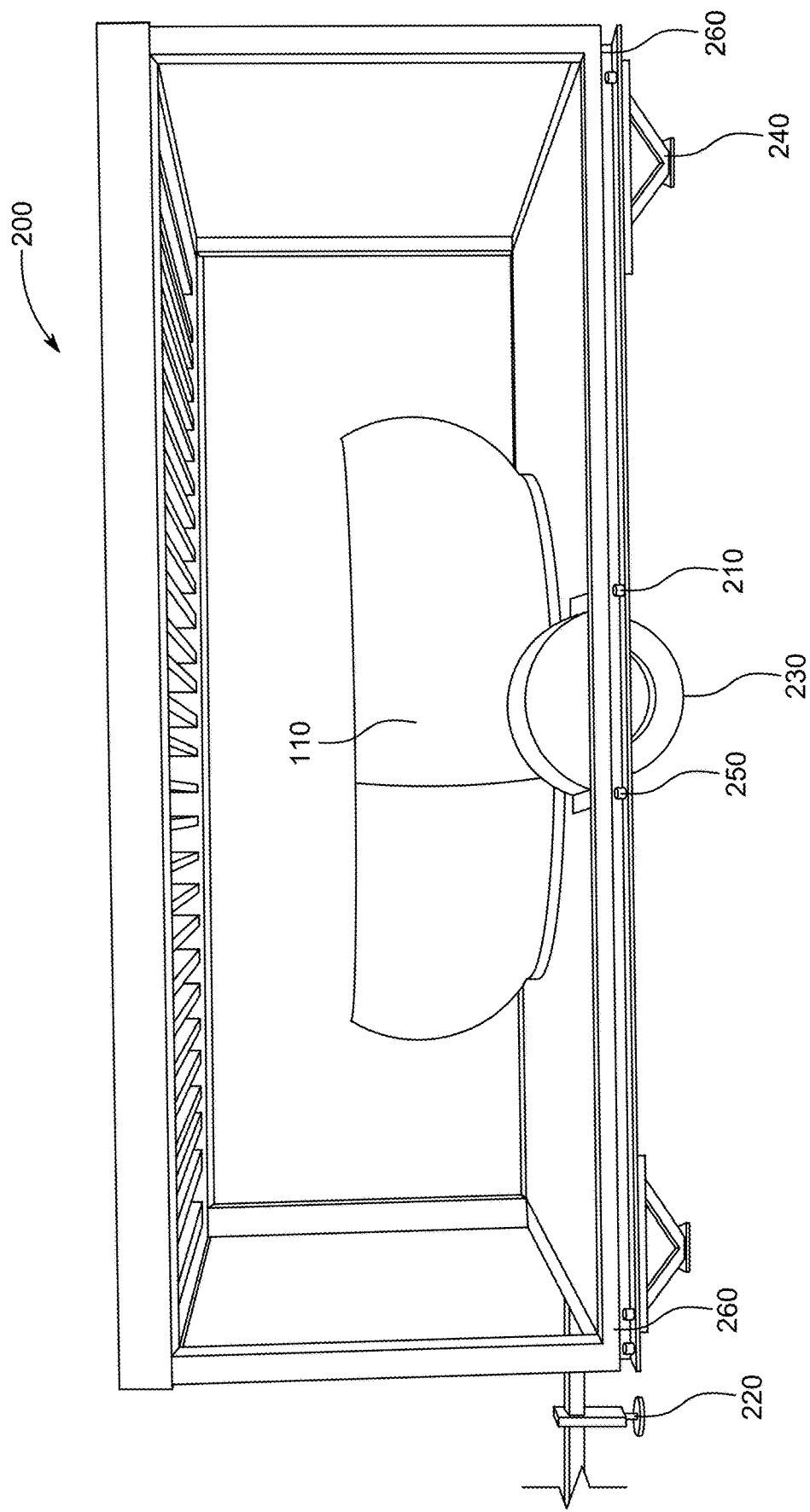
FIG. 2A depicts an exemplary embodiment of one section of a food stand disposed on a trailer and ready to be towed, according to at least some embodiments disclosed herein.

Referring now to FIG. 2A, an exemplary trailer 200 is shown for transporting the food stand support structure 110 to and from an event such as an outdoor celebration or the like. The support structure 110 may simply be placed on the platform 210 and secured during transport, by straps for example; or the support structure 110 may be removably or permanently coupled to the platform 210, such as with bolts or adhesive. As shown, trailer 200 comprises the platform 210 with support structure 110 disposed thereon, a removable hitch 220 and removable wheels 230. In embodiments, the hitch 220 may be attached at either end of the platform 210. In embodiments, wheels 230 may be designed to be removed when configuring a food stand. Such wheels may be held in place, for example, using removable pins 250, although other mechanisms for attaching and removing the wheels may be used. Scissor jacks 240, or other mechanical or hydraulic jacks, may be used to lower the platform 210 to the ground for configuring a partial or complete food stand, and to raise the platform 210 off the ground for configuration as a trailer.

Figure 2B:
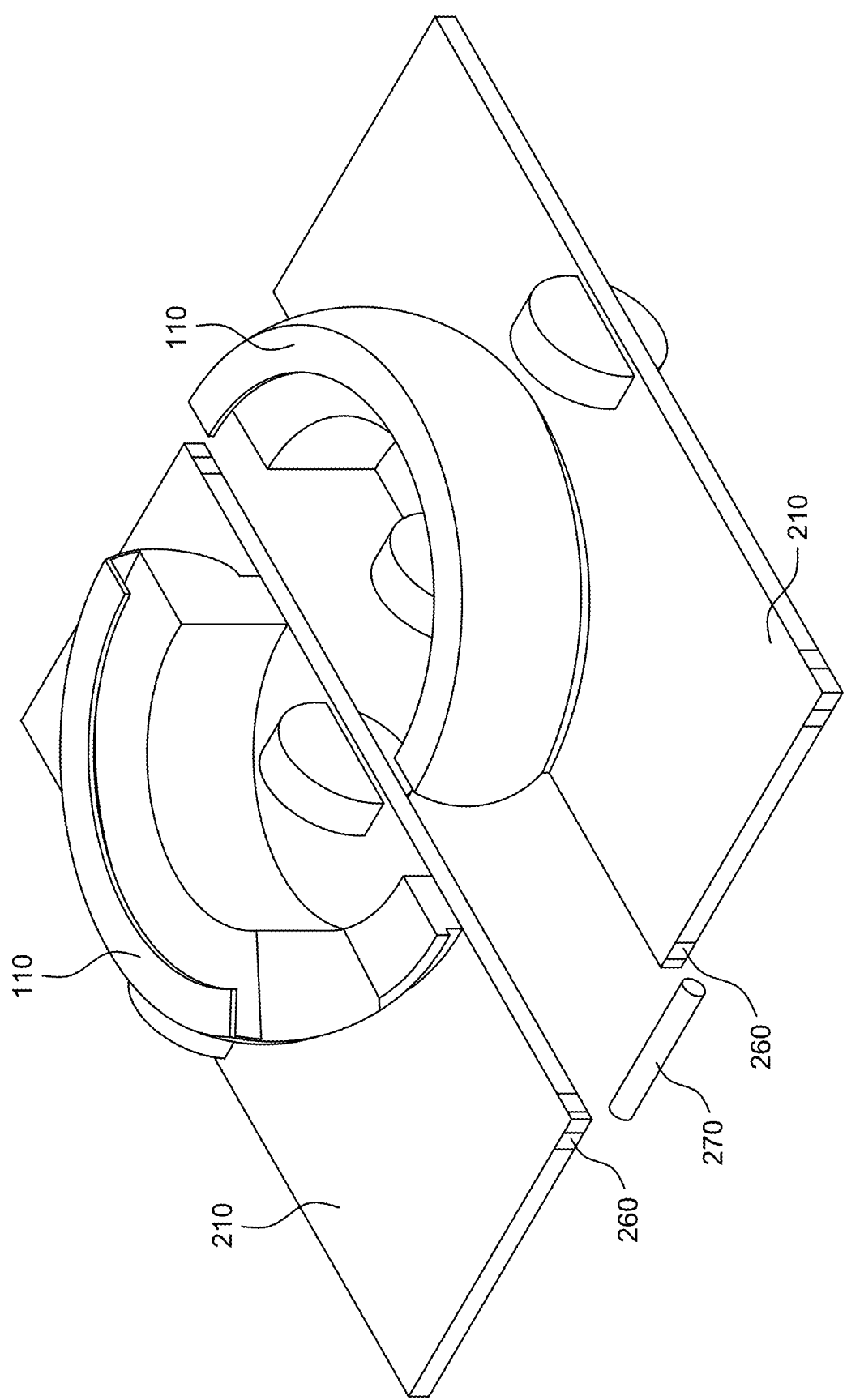
FIG. 2B depicts two portions of a food stand, each disposed on a respective trailer, positioned to facilitate assembly into a single food stand, according to at least some embodiments disclosed herein.
Figure 2C:
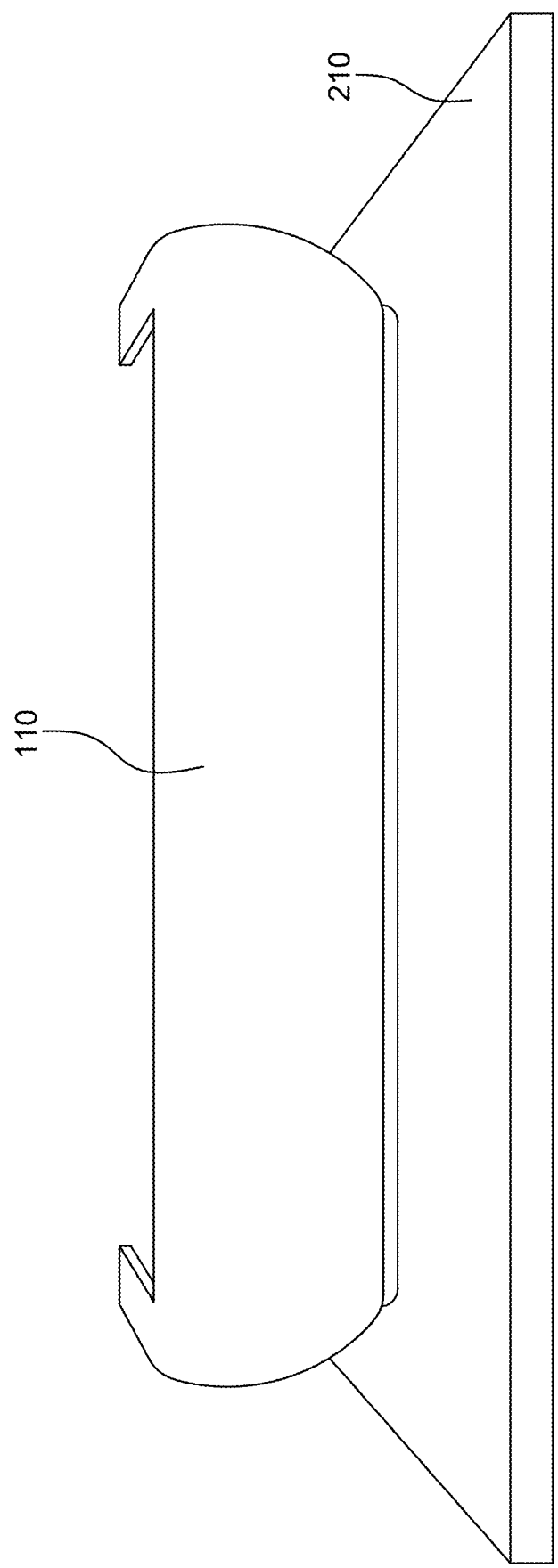
FIG. 2C depicts a front perspective view of an exemplary food stand, or a food stand section embodiment, comprising straight sides, according to at least some embodiments disclosed herein.

FIG. 2B illustrates two trailers 210 carrying respective support structures 110, that can be arranged to form a single food stand. When configuring the trailers and support structures as a food stand, the trailers can be secured together, for example, using coupling brackets 270 secured at coupling points 260. The support structures similarly may be provided with mechanisms to secure them together. Although two platforms 210 with two support structures 110 are shown, more than two platforms and support structures, having the same or different dimensions and plan views, may additionally or alternatively be used to assemble a food stand with a different configuration. Different support structure plan views can include, for example, portions of conic sections such as a quarter circle or half an ellipse (not shown), or having straight sides meeting at arcuate abutments, as illustrated in FIG. 2C. Of course, support structure segments having other shapes may additionally or alternatively be used.

Figure 3A:
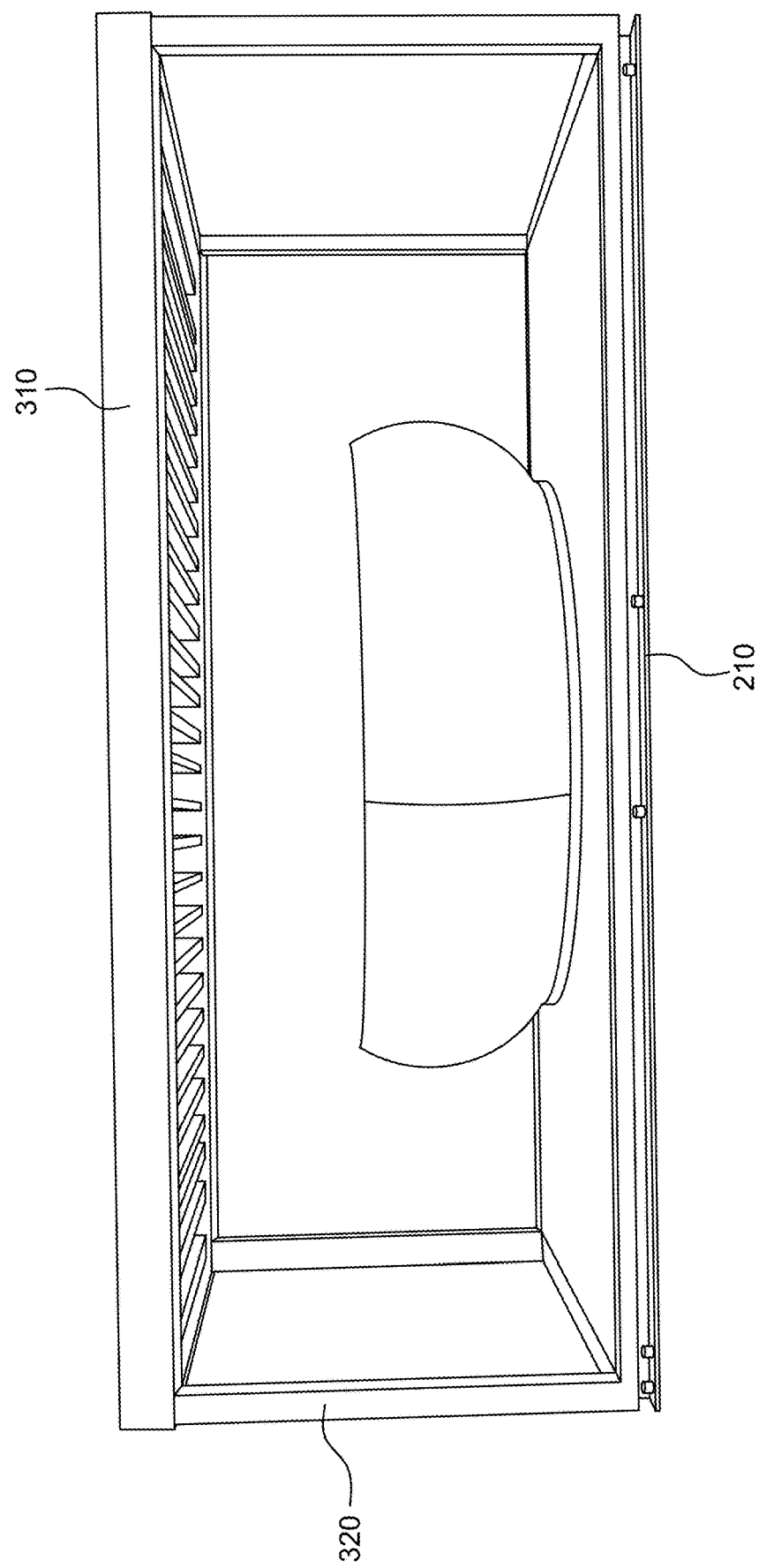
FIG. 3A depicts the embodiment shown in FIG. 2A with hitch and wheels removed, resting on a flat surface, according to at least some embodiments disclosed herein.
Figure 3B:
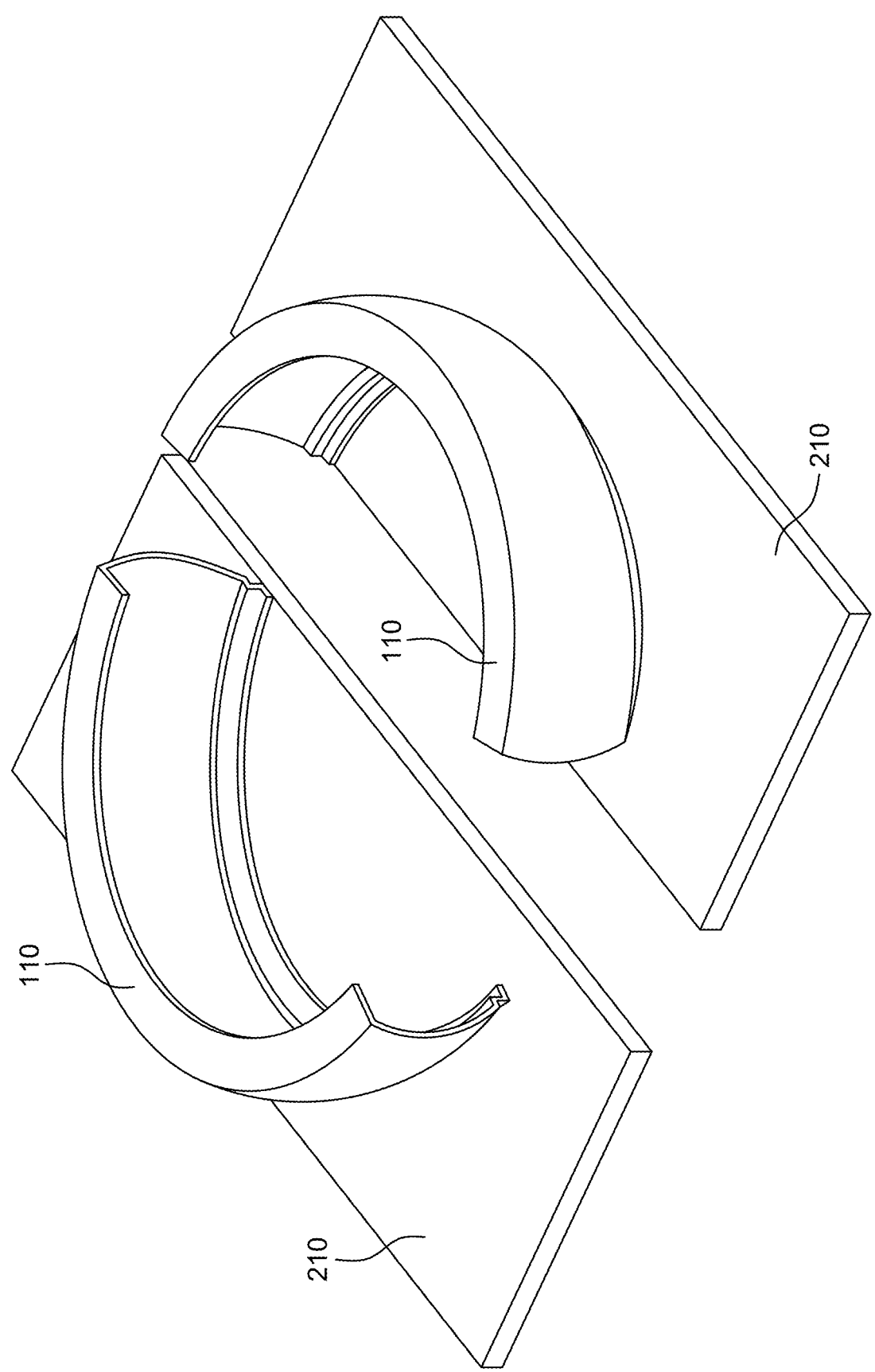
FIG. 3B depicts two portions of a food stand with hitches and wheels removed, according to at least some embodiments disclosed herein.

FIG. 3A shows the platform 210 with hitch and wheels removed and resting on the ground. As shown, the platform 210 may be provided with an open enclosure, for example, comprising a louvered top panel 310 supported by braces 320 attached to the platform 210. The louvers of the top panel 310 may be open as shown, or may be closed (not shown) in embodiments to provide protection from rain and sun. FIG. 3B illustrates a pair of platforms 210 and support structures 110 in position to be pushed together and secured with braces or the like at coupling points, as has been described relative to FIG. 2B.

Figure 4C:
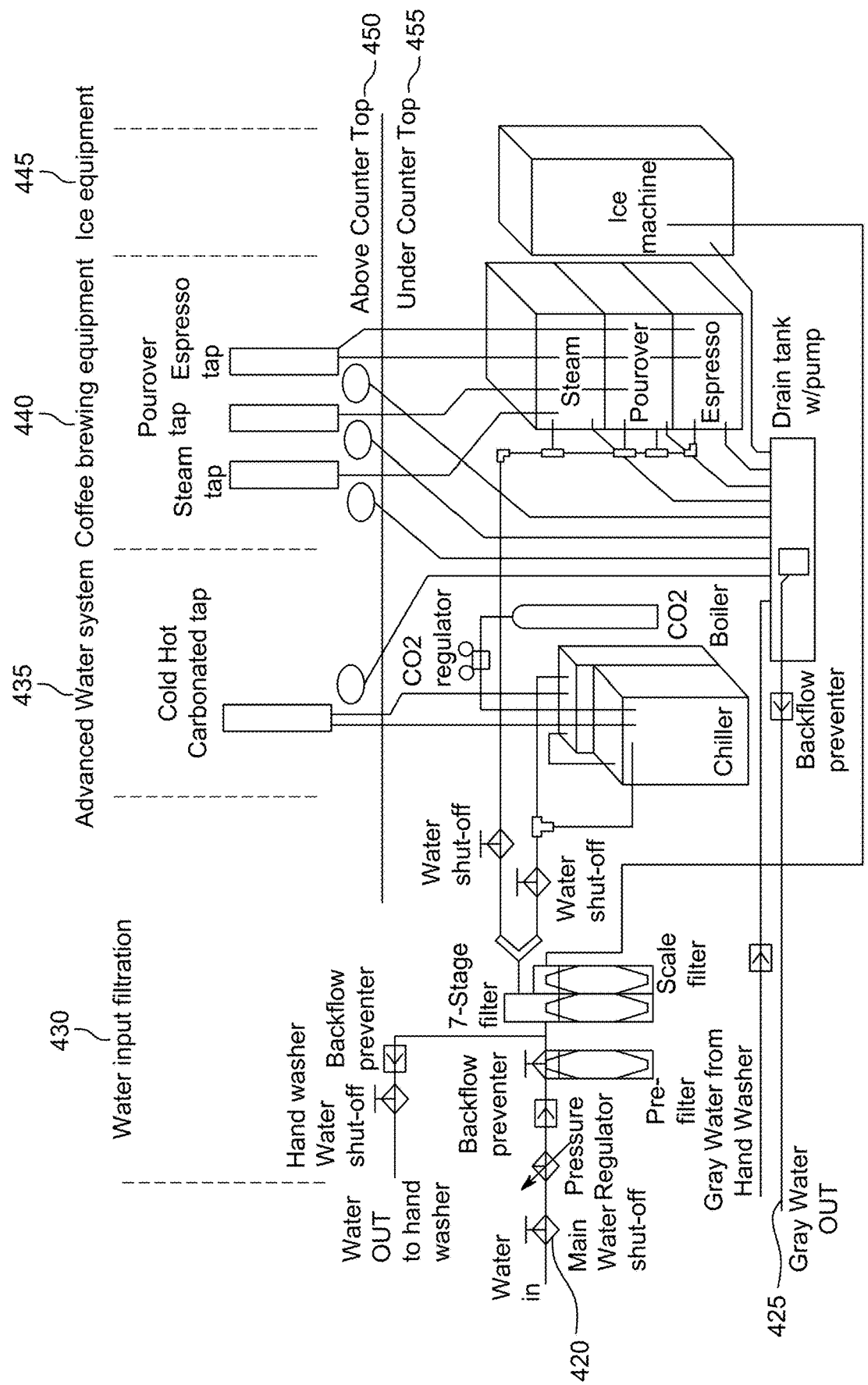
FIG. 4C depicts a water system diagram of an exemplary food stand, according to at least some embodiments disclosed herein.

FIG. 4A is a rear view of a food stand support structure 110, that has a semicircular plan view. As shown, a plurality of components are disposed within the compartment between the top and bottom of the structure. Those components can include a sink, food preparation appliances, tanks, and the like, that may require power, wiring, and/or piping to be operational. The brace 150 is substantially planar with a protruding portion 600 having a first side 602 located opposite a second side (not shown). The brace 150 is disposed between the bottom of the support structure and the countertop 120. The brace 150 has one or more openings (FIG. 8) traversing from the first side 602 of the protruding portion 600 of the brace 150 to the second side (not shown) of the protruding portion 600 of the brace 150. A radiused outer perimeter edge 604 of the protruding portion 600 of the brace 150 abuts and conforms to the convex customer-facing surface 140 and is oriented perpendicular to the convex customer-facing surface 140. FIG. 4B is a cutaway view showing wiring and piping 410 disposed at the rear of the compartment defined by the structure. Braces 150 are shown positioned as they would be inside the compartment. The braces 150 have holes 415 through which the wiring and piping pass. FIG. 4C is an example of a utility diagram, in this case a water system diagram. As shown, the water is pumped into the system through the main water shut-off valve 420. The diagram shows the flow of water through the system to the gray water outlet 425. The water system provides water to the food stand for functions that can generally be categorized as water input and filtration 430, beverage supply 435 including flat, carbonated, or both, brewing and steaming 440, such as for coffee and espresso, and ice production 445. The taps for the water-based products are disposed above the counter top 450, while the other functional elements are disposed under the counter 455 in the food stand support structure 110, such as chiller, boiler, brewer, etc. Other diagrams (not shown) may show other utilities, such as a wiring diagram (not shown) to show electrical wiring, a network diagram showing network cabling and ports, radio frequency access points and other air interfaces, and the like.

Figure 4D:
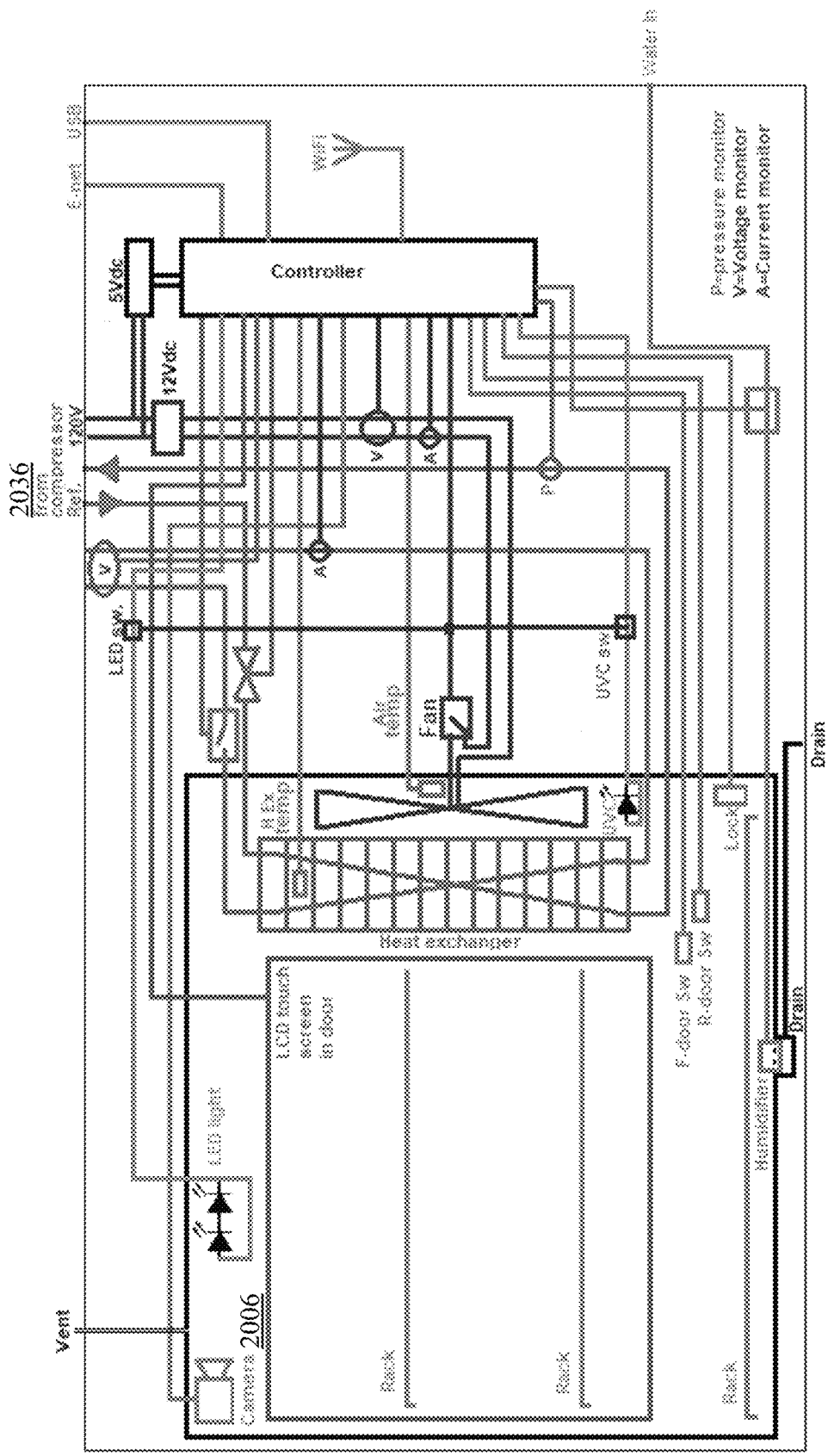
FIG. 4D depicts a diagram of an exemplary food preparation appliance, according to at least some embodiments disclosed herein.

FIG. 4D is a diagram showing elements of a food preparation appliance 160. In embodiments, the appliance 160 contains sources for both heat and cold to produce a wide range of temperatures, indicated generally by dotted oval 460. A plurality of sensors, switches, and control elements 465 are communicatively coupled to a controller 470. In embodiments, the controller may be communicatively coupled to one or more computing devices, e.g., local devices via a Wi-Fi antenna 475, or remote computing devices or servers via a cellular antenna 480, or both. Accordingly, appliance 160 may be fully managed electronically, either locally or remotely, and may be programmable to perform any of its functions in any sequence and time frame. Because the appliance 160 can produce a wide range of temperatures, it is suitable for food preparation activities from cooking through freezing, such as defrosting and heating to ready-to-eat, to holding at a temperature. In an embodiment, the door of the appliance can be locked and unlocked by a customer using an app downloaded and installed onto their computing device, such as a smart phone. This allows the customer to access food within a compartment of the appliance after verification of payment, which may also be an electronic payment effected using the app. Such an appliance may be configured to be stackable, and so may be implemented with any number of compartments as an automart, for example for use in a hotel convenience store, or for staff use unlocked for constant access.

Figure 5:
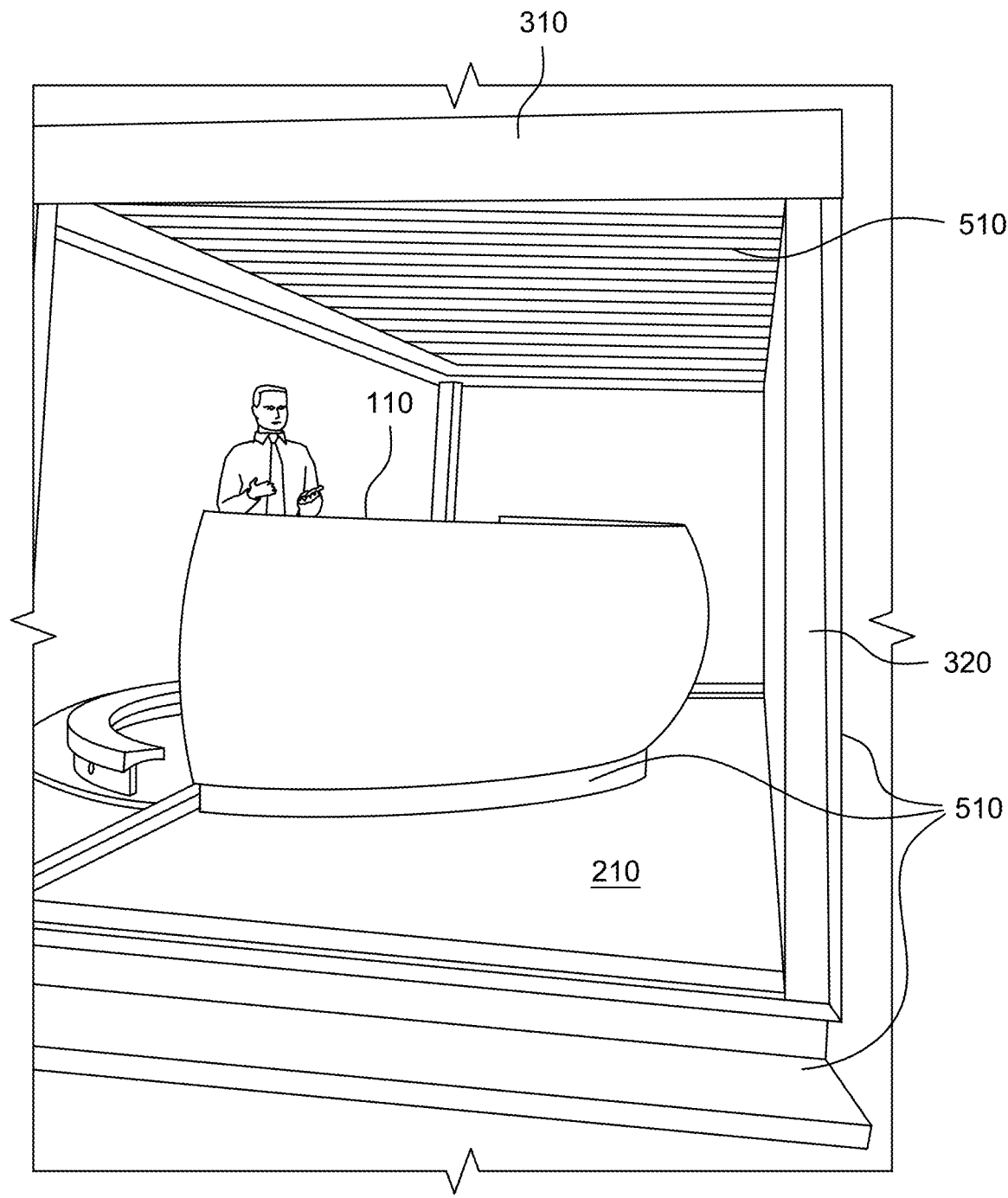
FIG. 5 depicts a side view of an exemplary food stand embodiment, according to at least some embodiments disclosed herein.

FIG. 5 is a side view of a food stand embodiment. Here, the support structure 110 has a semicircular plan view and a curved front surface. The platform 210 is resting on the floor, and top panel 310 and supporting braces 320 are also shown. In addition, the illustrated embodiment includes a plurality of lights, such as light emitting diodes (LEDs), disposed at various locations to provide illumination, here including lighting 510 at the bottom of the support structure, under the top panel, along the panel supports, and around the periphery of the platform. The lighting may be selected to have a distinctive appearance, for example, by choosing lights of a particular intensity, color, placement, variability, and the like, which may constitute an identifiable and protectable trade dress.

Figure 6A:
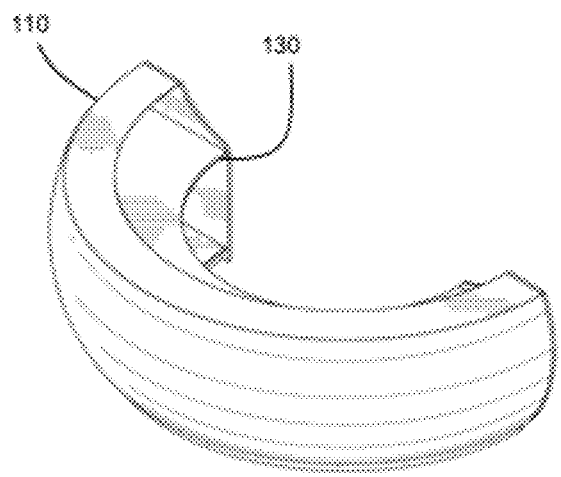
FIGS. 6A and 6B depict perspective views of two exemplary food stand configurations, according to at least some embodiments disclosed herein.
Figure 6B:
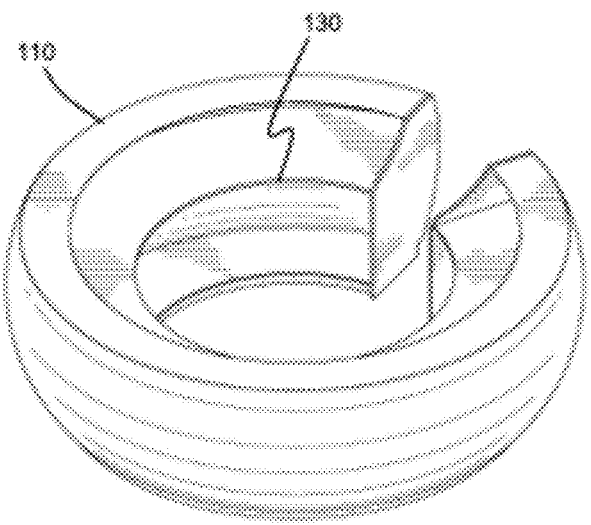

FIGS. 6A and 6B are perspective views of two exemplary food stand support structure configurations. FIG. 6A shows a support structure having a semicircular plan view, whereas the support structure shown in FIG. 6B has a circular plan view, with a gap for entering and exiting the central service area. As shown, both configurations include a shelf 130. Of course, other configurations may be used without departing from the scope of the invention. For example, the support structure may be divisible into a plurality of pieces, with other sections coupled to one or more of them. For example, a semicircular support structure may be divided in half, and a straight food bar section removably inserted therebetween. Or, such alternate configurations may be permanently formed.

Figure 7:
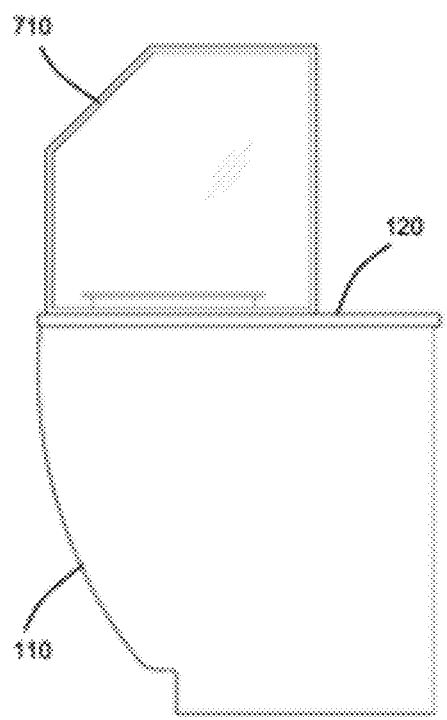
FIG. 7 depicts a side view of a portion of an exemplary food stand configuration, according to at least some embodiments disclosed herein.

FIG. 7 is a side view of an exemplary supporting structure having a linear plan view. This embodiment includes a so-called sneeze guard or shield 710 disposed on the countertop 120 to prevent customer contact with items on the countertop or in the server work area. The sneeze shield may simply be placed on the countertop, or may be temporarily or permanently coupled thereto. As shown, the sneeze shield is formed from flat transparent panels.

Figure 8:
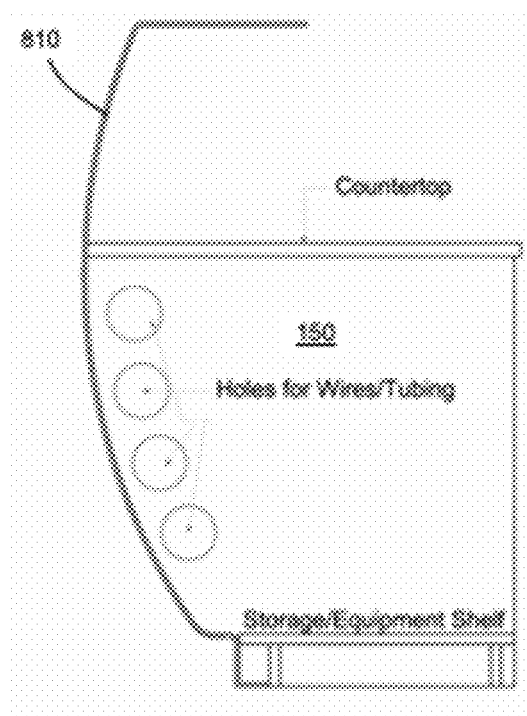
FIGS. 8, 9, and 10 depict cutaway side views of exemplary food stand configurations, with and without a transparent enclosure disposed on the countertop, according to at least some embodiments disclosed herein.

FIG. 8 is a cutaway side view of another embodiment with a sneeze shield 810, in which the sneeze shield has a curved front surface co-extensive with the front surface of the support structure, and a flat top surface. This cutaway view shows a vertical brace 150 with holes that wires and tubing may pass through.

Figure 9:
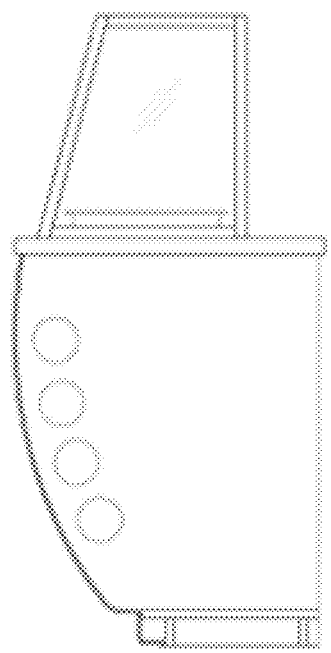
Figure 10:
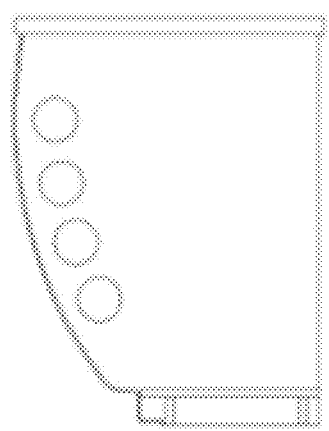

FIG. 9 is a side cutaway view of another exemplary embodiment, wherein the sneeze guard has yet another configuration. FIG. 10 is a side cutaway view of an exemplary embodiment similar to that shown in FIG. 9, but without a sneeze shield. Of course, many other configurations may be used without departing from the scope of the invention.

Figure 11:
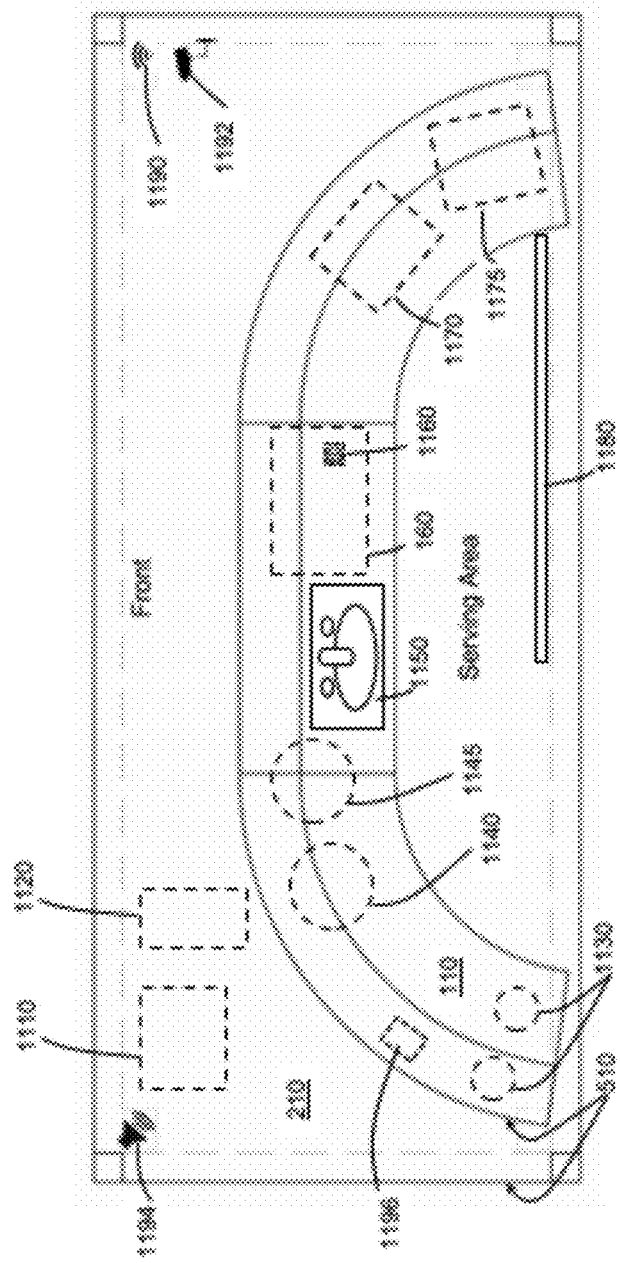
FIG. 11 depicts a plan view of an exemplary food stand and platform, according to at least some embodiments disclosed herein.
Figure 12A:
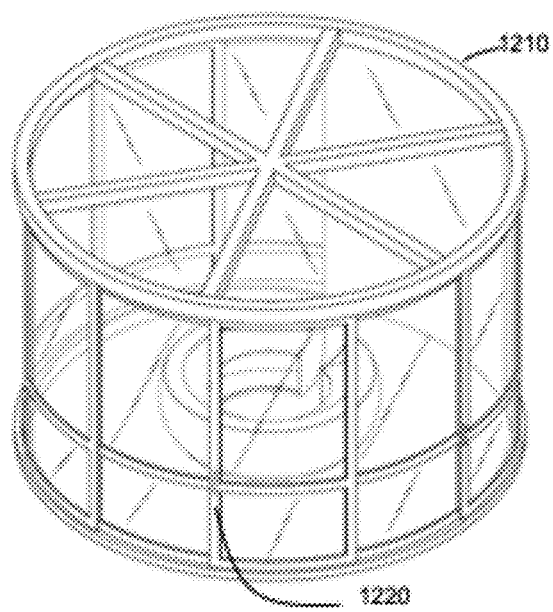
FIGS. 12A, 12B, 12C, and 12D depict exemplary food stand enclosure embodiments, according to at least some embodiments disclosed herein.
Figure 12B:
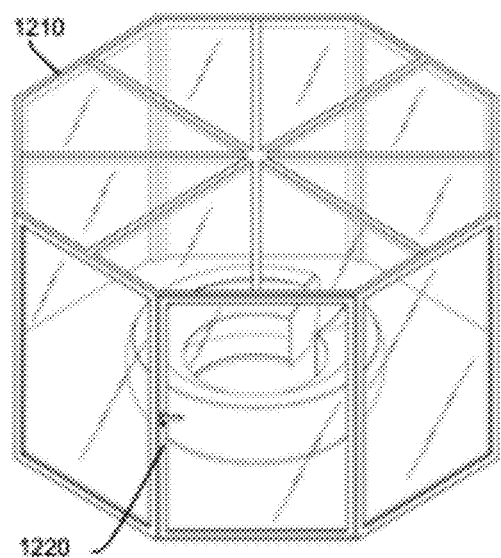
Figure 12C:
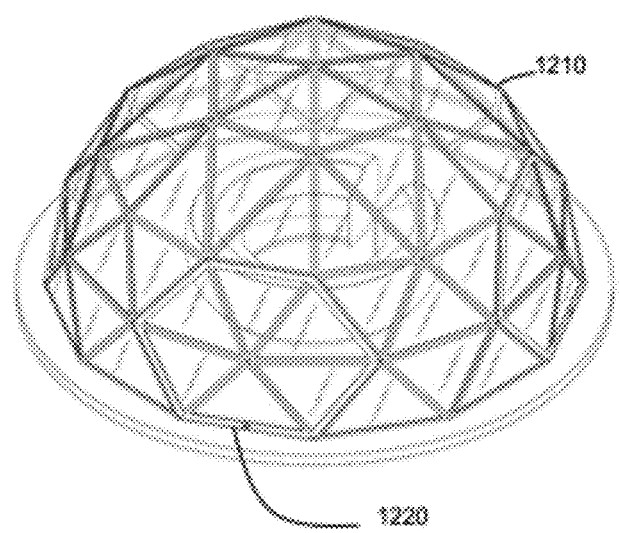
Figure 12D:
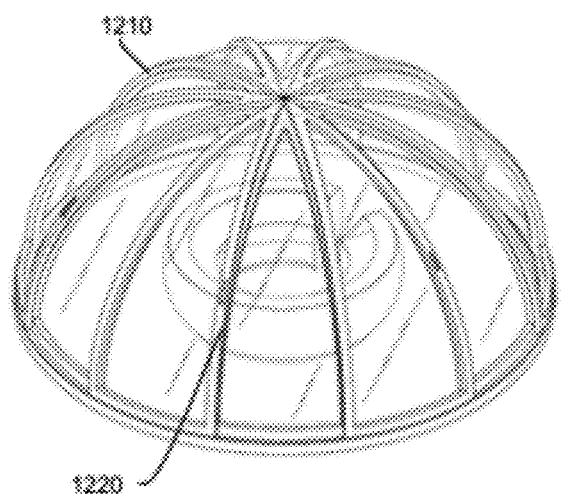

FIG. 11 is a plan view of a food stand embodiment comprising the platform 210, and two curved end sections with a straight section inserted between them. The curved end section may alternatively be coupled together to form a roughly semicircular support structure (not shown). The straight section may be configured as a serving bar having two ends, each end removably attached to one of the two parts of the divided semicircular support structure. The straight central serving bar may be one of a plurality of swappable serving bars, each configured to be used for a different respective type of event, or to provide a different arrangement of components.

As previously described, platform 210 has a power source 1110 disposed therein, arranged to provide power to components of the food stand. For example, the power source 1110 may provide power to the appliance in accordance with an energy management procedure for operating the power source, the appliance, or both. The power source may be or include a fuel cell that generates power from a fuel such as liquefied petroleum gas (LPG, a/k/a propane) or liquefied natural gas (LNG), or another liquid hydrocarbon fuel. In some examples, diesel may be used. In this embodiment, the power source 1110 may provide power directly to energy-consuming components, or it may charge batteries 1120 which may also be disposed inside platform 210 for later power delivery, or both. In other examples, the power source 1110 may comprise a battery or a solar power source. Regardless, fuel for the power source 1110 is stored in tanks 1130, which may be disposed under the countertop, or at any other convenient location. In further examples, the power source 1110 may be an external power source, such as an electric utility company in a fixed location or a temporary location.

Also shown are hot and cold water tanks 1140, 1145, sink 1150, food preparation appliance 160 coupled to one or more sensors 1160, a microwave or other oven 1170, and a refrigerator 1175. Other illustrated power consuming components include LED or other lighting 510, for example disposed at a bottom edge of the support structure 110, the platform 210, or both. Also included may be a flat panel display 1180, a Wi-Fi hotspot 1190, a security camera 1192, a speaker or speaker system 1194 powered by an amplifier 1196. In a currently preferred embodiment, flat panel display 1180 can show a menu for viewing by customers, among other things.

FIG. 19-FIG. 22 depict a touchless hand washing station 1900 that may be affixed to the full food stand 100 (e.g., of FIG. 1) or the semi-circular food stand 100 (e.g., of FIG. 6A). In some examples, the touchless hand washing station 1900 may be affixed to the food stand 100 via a slide-in/slide-out attachment mechanism. However, it should be appreciated that other means/mechanisms may be used to affix the touchless hand washing station 1900 to the food stand 100. In further embodiments, the touchless hand washing station 1900 may be used as a stand-alone component independent from the food stand 100.

Figure 19:
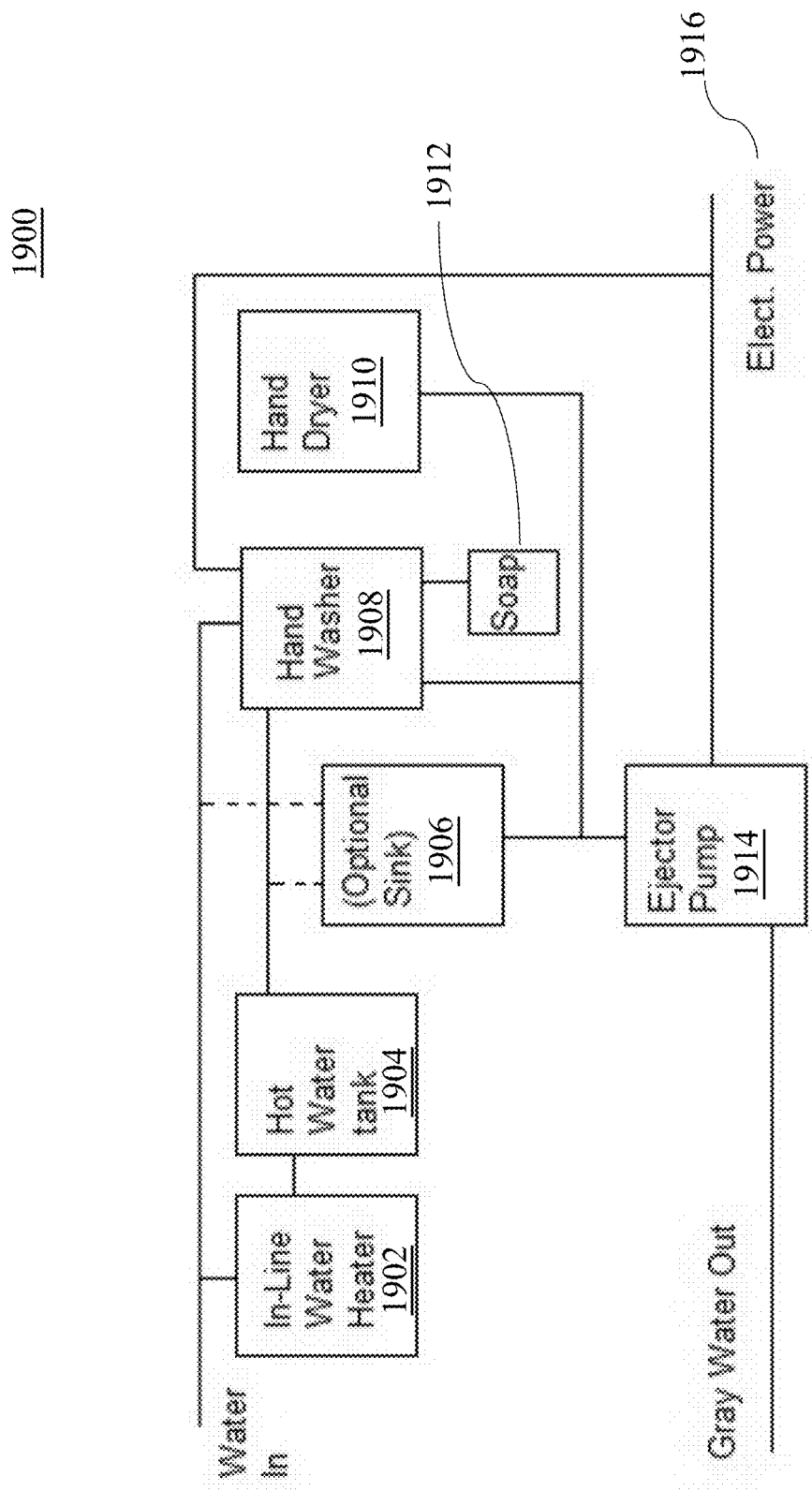
FIG. 19 depicts a block diagram of a hand washing station, according to at least some embodiments disclosed herein.
Figure 20:
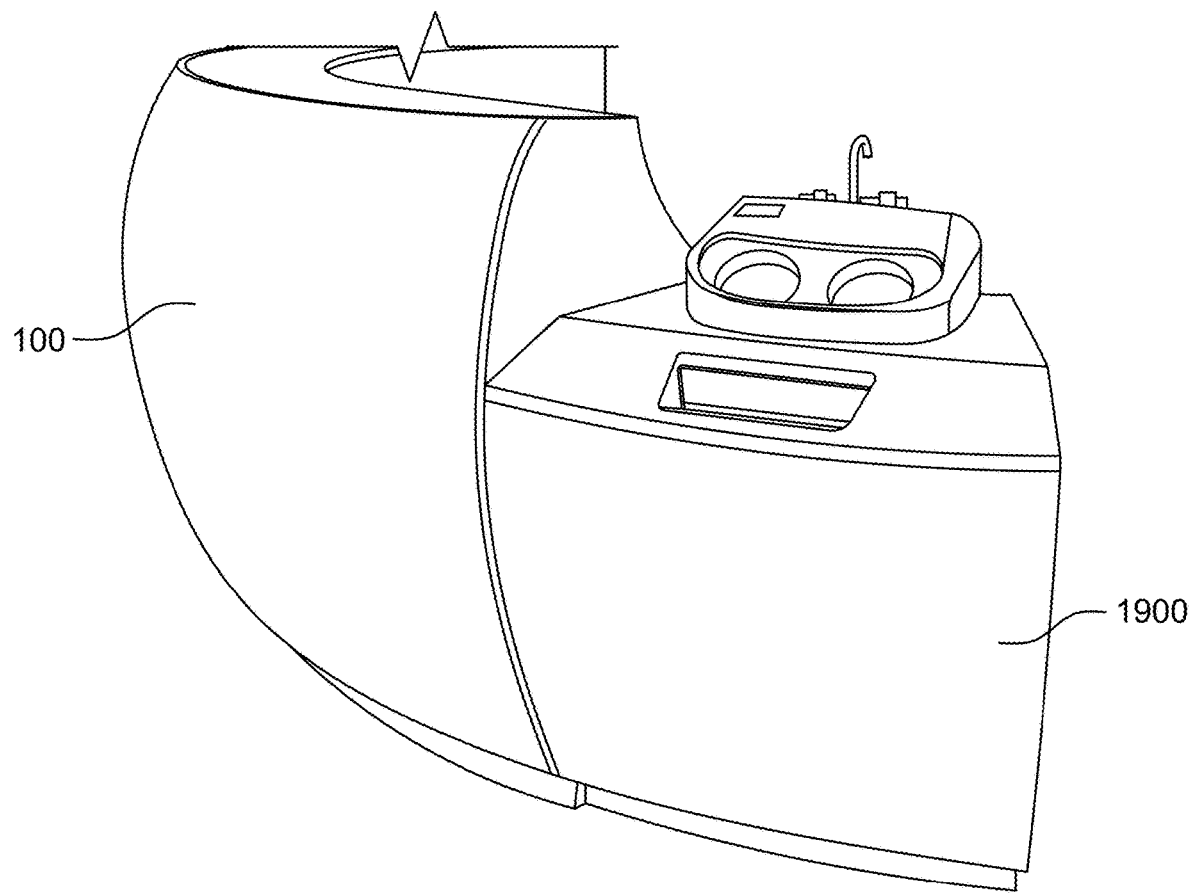
FIG. 20 depicts a schematic diagram of a hand washing station, according to at least some embodiments disclosed herein.
Figure 21:
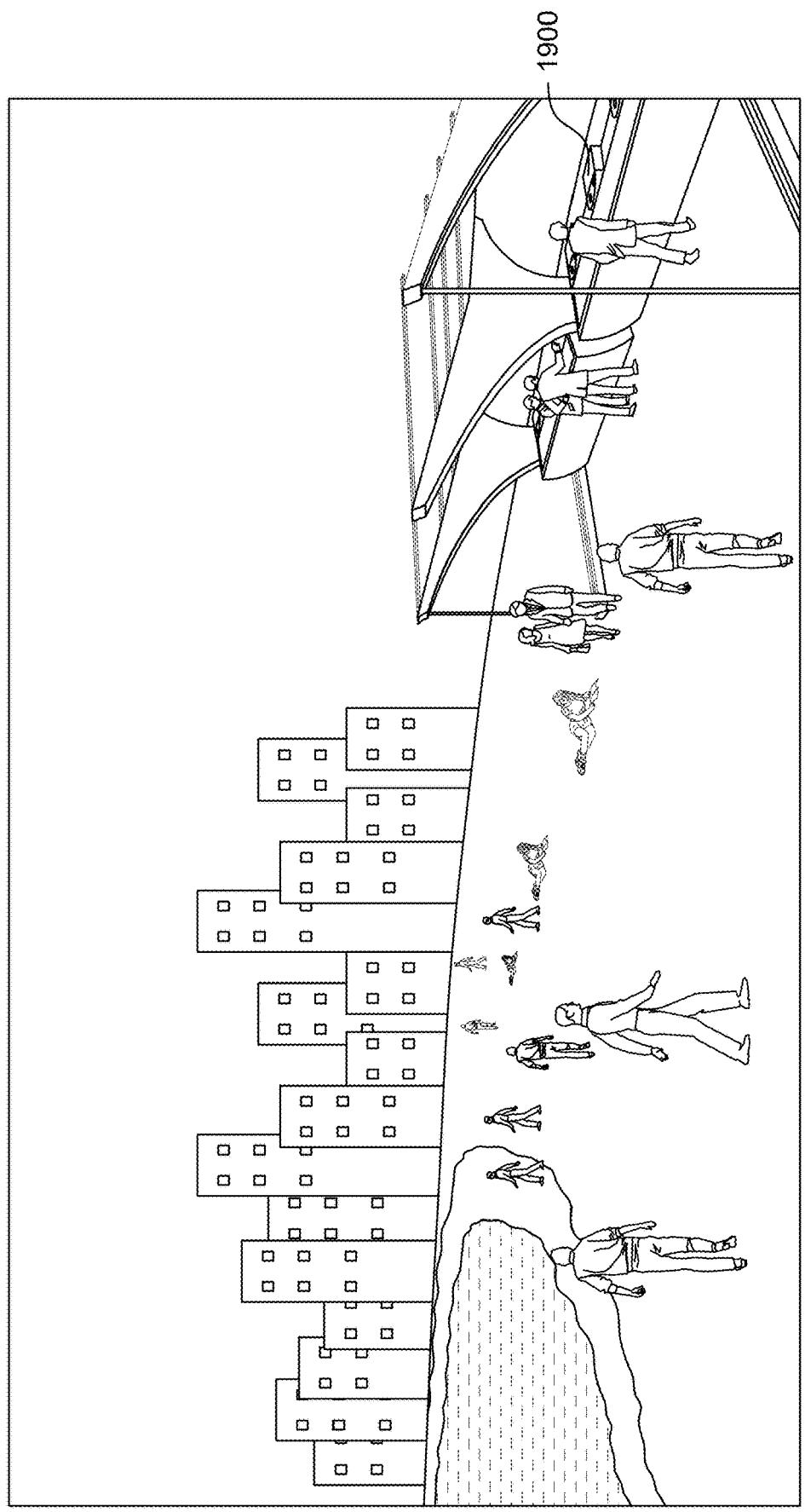
FIG. 21 and FIG. 22 depict schematic diagrams of a hand washing station, according to at least some embodiments disclosed herein.
Figure 22:
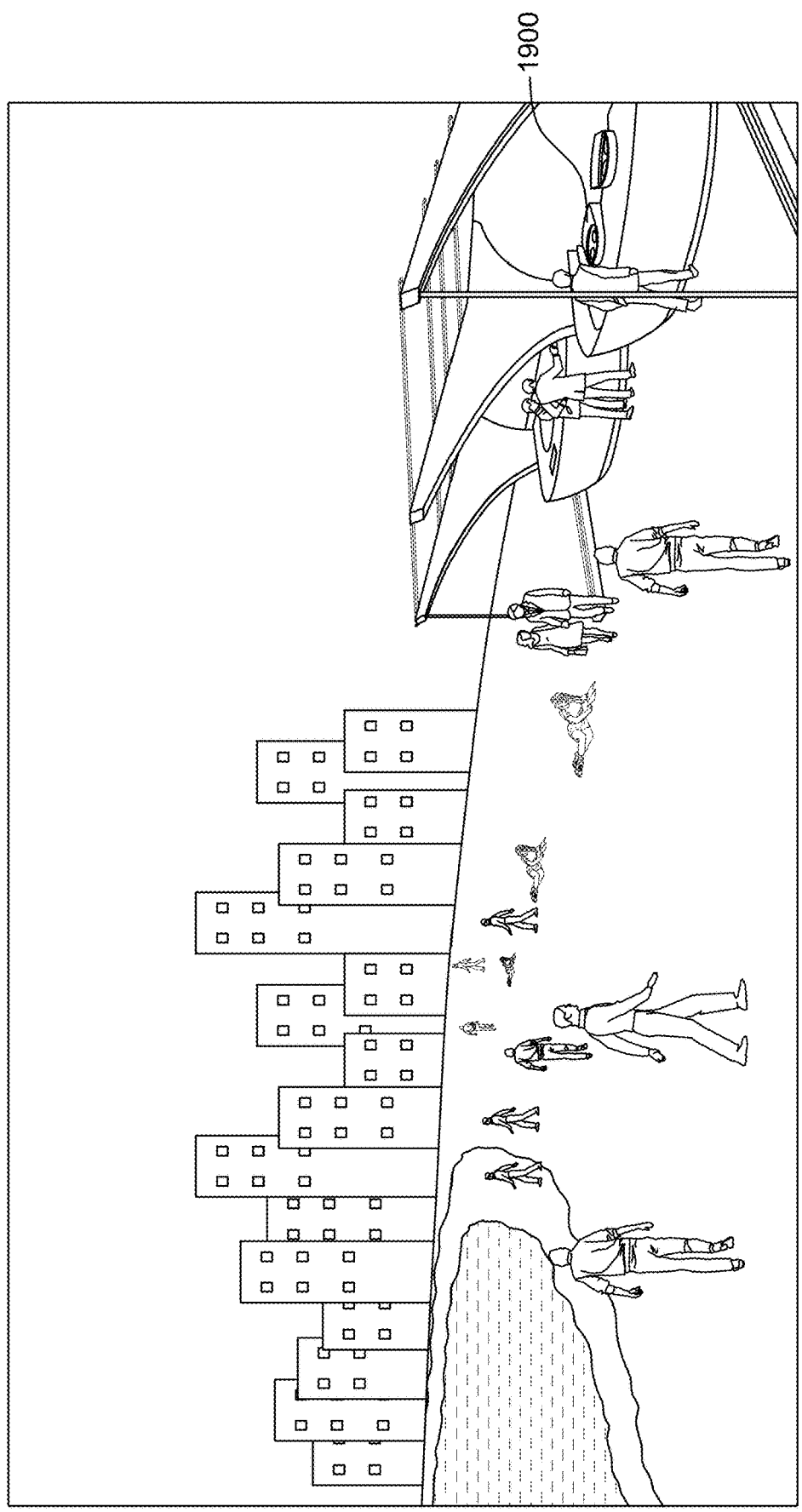

As shown in FIG. 19, the touchless hand washing station 1900 may include numerous components, such as: an in-line water heater 1902, a hot water tank 1904, a hand washer 1908, soap 1912, a hand dryer 1910, and an ejector pump 1914, among other components not explicitly listed herein. Optionally, a sink 1906 may be included as a component of the touchless hand washing station 1900. Water may enter the in-line water heater 1902, which utilizes the hot water tank 1904 to heat the water. This hot water may be used by the hand washer 1908. An electrical power component 1916 may transmit power to the hand washer 1908, the ejector pump 1914, and/or the hand dryer 1910. The ejector pump 1914 may serve to move gray water out from the touchless hand washing station 1900.

Turning now to FIGS. 12A, 12B, 12C, and 12D, a plurality of exemplary enclosures 1210 are shown disposed around or coupled to the platform, defining a space surrounding the food stand support structure. The enclosures are equipped with a door 1220 mounted thereto for entering and exiting the space. Of course, other enclosures and food stand embodiments may be used without departing from the scope of the invention.

In the computer-related disclosure that follows, the terms "component" and "system" may include hardware, a combination of hardware and software, or software executing on hardware, in addition to these terms as used in the foregoing disclosure. For example, a computer-related component may be or include a processor or a process running on a processor, a magnetic disk drive or other data storage drive, a software or data object, an executable program or routine, or the like. By way of illustration, an application running on a computer and the computer can be a component of a system. A component can be localized in one computing device or distributed between a plurality of computing devices.

Furthermore, some or all of the computer-related disclosure may be implemented using standard programming and/or engineering techniques to produce software, firmware, hardware, or any combination thereof to automate and/or control aspects of the disclosed matter. The term "article of manufacture" is intended to encompass a tangible data storage device or medium storing computer readable instructions that cause a computing environment to perform certain actions. For example, a computer readable medium can include a magnetic storage device such as a hard disk, an optical disk such as a compact disk (CD) or digital versatile disk (DVD), a flash memory such as a USB thumb drive, and the like. It should also be appreciated that electrical or electromagnetic signals can be used to convey computer-readable electronic data between network-attached devices. For example, such data carrying signals can be transmitted and received, for example, over a network such as the Internet or a local area network (LAN). Those skilled in the art will recognize many modifications may be made to the following illustrative configurations without departing from the scope or spirit of the claimed subject matter.

Figure 13:
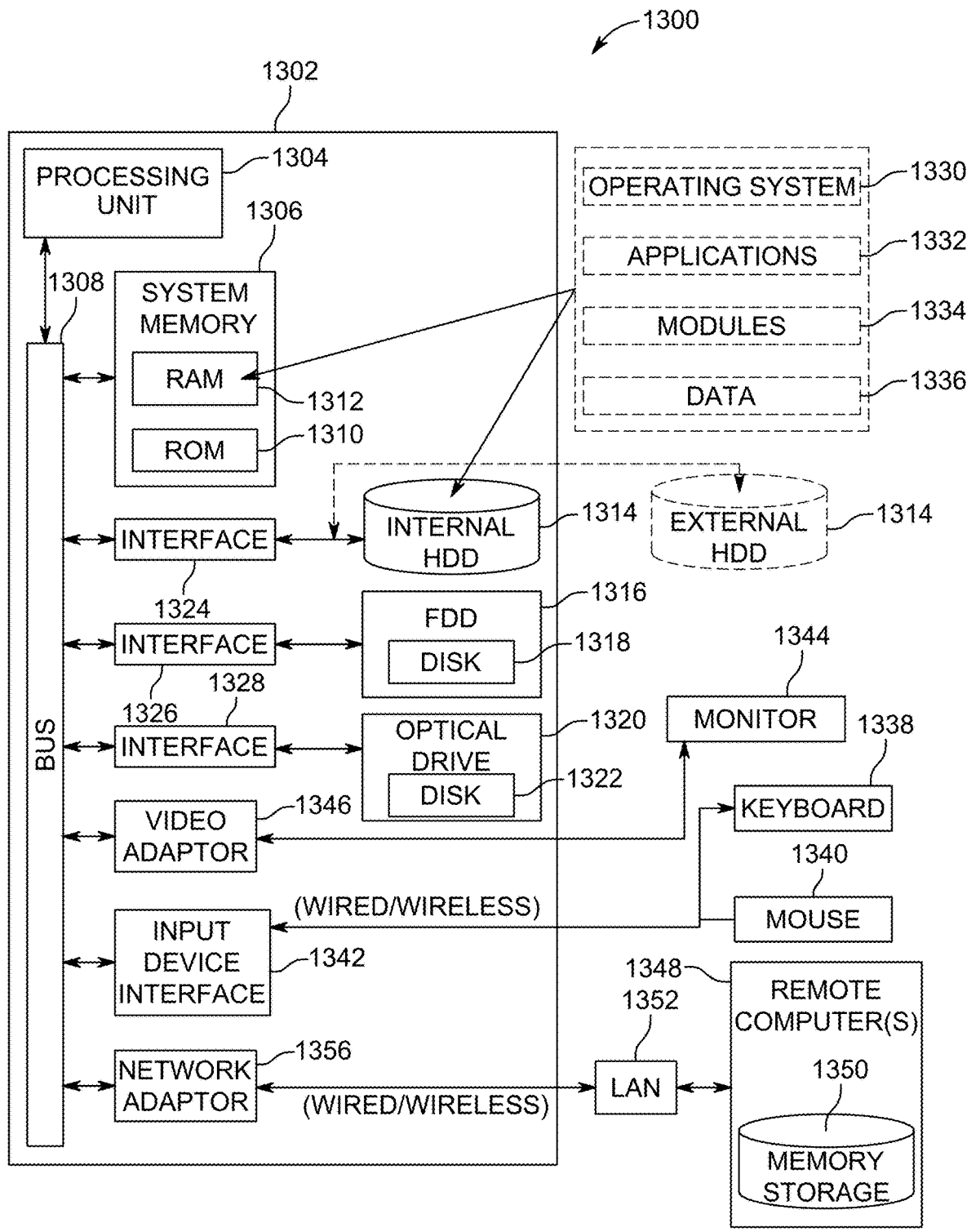
FIG. 13 depicts a block diagram of exemplary computer components operable to execute aspects of the disclosed system.

FIG. 13 is a block diagram illustrating an exemplary computing device operable to execute aspects of the disclosed system. In particular, FIG. 13 and the corresponding discussion are intended to provide a brief, general description of a suitable computing environment 1300 in which the various aspects of the claimed subject matter can be implemented. Generally, program modules can include routines, programs, components, data structures, etc., that can be used to perform particular tasks or implement particular abstract data types. However, those skilled in the art will appreciate that other computer system configurations may be used to implement portions of the disclosed subject matter, such as single-processor or multiprocessor computer systems, cloud-based systems, personal computers, hand-held computing devices such as smart phones, microprocessor-based or programmable consumer electronics, and the like, any of which can be operatively coupled to any number of associated devices.

The illustrated aspects of the disclosed embodiments may also be practiced in distributed computing environments in which certain tasks are performed by remote processing devices that are linked through a communications network. In such a distributed computing environment, computer programs or portions of programs can be stored and/or executed locally, remotely, or both.

Referring now to FIG. 13, an illustrative computing environment 1300 for implementing various aspects of the disclosed embodiments includes a computer 1302 having a processing unit 1304, a system memory 1306 and a system bus 1308. The system bus 1308 couples system components including the system memory 1306 to the processing unit 1304. The system bus 1308 may further connect to a memory bus (with or without a memory controller), a peripheral bus such as a universal serial bus (USB), or other local bus using any of a variety of commercially available bus architectures. The system memory 1306 may include read only memory (ROM) 1310 and random access memory (RAM) 1312. A basic input/output system (BIOS) may be stored in a non-volatile memory 1310, such as a ROM, EPROM, EEPROM, or the like. The BIOS contains the basic routines that help to transfer information between elements within the computer 1302, such as during start-up. The RAM 1312 can be or include a high-speed memory such as static RAM for caching data.

The computer 1302 includes one or more data storage devices, such as hard disk drives (HDD) 1314, which may be disposed inside and/or outside of a suitable chassis. As shown, computer 1302 also includes a drive 1316 for use with a removable magnetic storage medium 1318 on which data can be written and read from, and an optical drive 1320 for use with a removable optical disk 1322 such as a CD or DVD. The hard disk drive 1314, magnetic disk drive 1316 and optical disk drive 1320 can be connected to the system bus 1308 via a hard disk drive interface 1324, a magnetic disk drive interface 1326 and an optical drive interface 1328, respectively.

The drives and their associated computer-readable media provide nonvolatile storage of electronic data, data structures, computer-executable instructions, and the like. For example, the media may store computer-executable instructions that, when executed on the processor 1304, cause the computer to perform the automated methods of the disclosed subject matter.

Program modules and the like can be fetched from a nonvolatile storage device and held in RAM 1312 for speedy execution and access, including an operating system 1330, one or more application programs 1332, other program modules 1334, and program data 1336.

Commands and information can be entered into the computer 1302 through one or more wired/wireless input devices, such as a keyboard 1338 and a pointing device 1340. These and other input devices may be connected to the processing unit 1304 through input device interface 1342 coupled to the system bus 1308, which may be a USB port for example. A monitor 1344 or other display device is also connected to the system bus 1308 via an internal or external video interface, such as a video adapter 1346.

The computer 1302 may operate in a networked environment using physical or logical connections via wired and/or wireless communications to one or more remote computers, such as remote computer(s) 1348. The remote computer(s) 1348 can include one or more of a workstation, a server computer, a router, a personal or portable computer, any of which may include some or all of the elements described in connection with the computer 1302. For example, a network attached storage device 1350 is illustrated, and can be accessed by computers and other network attached devices. The logical connections depicted include wired/wireless connectivity to a local area network (LAN) 1352 and can also include larger networks, such as the Internet.

For example, when used in a LAN networking environment, the computer 1302 is connected to the local network 1352 through a wired or wireless communication network interface or adapter 1356. The adaptor 1356 may facilitate wired or wireless communication to the LAN 1352, which may also include a wireless access point disposed thereon for communicating with the wireless adaptor 1356. In a networked environment, program modules depicted with regard to the computer 1302, or portions thereof can be stored in the remote memory/storage device 1350. It will be appreciated that the network connections shown are illustrative and other means of communication between computers can be used.

The computer 1302 may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, telephone). This can include Wi-Fi and Bluetooth wireless technologies, for example. Thus, the communication means can be a predefined structure as with a conventional network or simply an ad hoc communication between at least two devices.

Wi-Fi is a technology for wireless local area networking with devices based on the IEEE 802.11 standards. It can be used, for example, to enable a user communications device to wirelessly connect to a network access point from a short distance away (e.g., 50 feet or less). Wi-Fi networks use radio technologies called IEEE 802.11x (a, b, g, etc.) to provide reliable, fast, securable wireless connectivity. A Wi-Fi network can be used to connect computers to each other, to the Internet, and to other wired and/or wireless networks (which use IEEE 802.3 or Ethernet).

Wi-Fi networks can operate in the unlicensed 2.4 and 5 GHz radio bands or other available bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10 BaseT wired Ethernet networks used in many offices.

Figure 14:
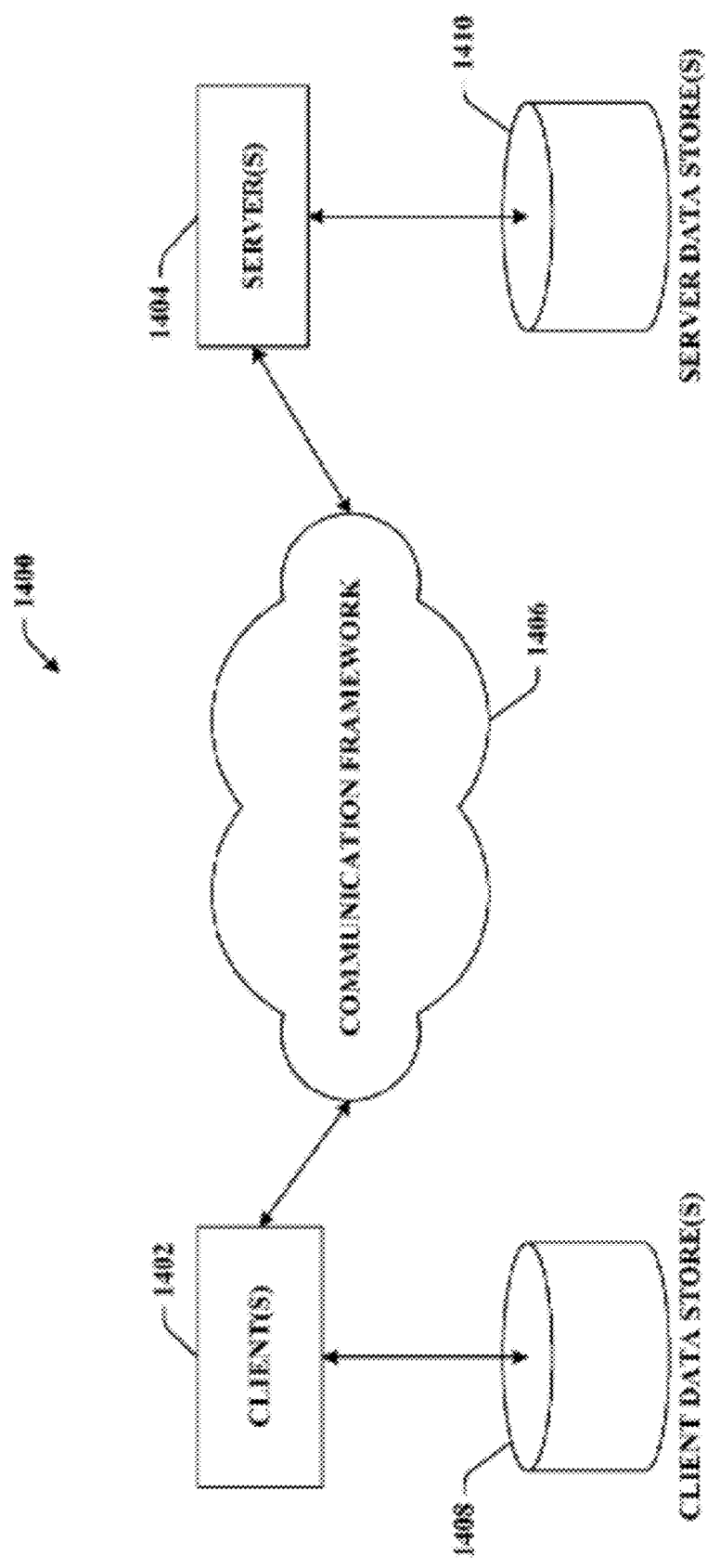
FIG. 14 depicts a simplified block diagram of an illustrative computing framework suitable for realizing aspects of the disclosed system.

Referring now to FIG. 14, there is illustrated a schematic block diagram of an illustrative computing environment 1400 for processing the disclosed architecture in accordance with other aspects of the disclosed embodiments. The system 1400 includes one or more client computers 1402. The client(s) 1402 can include hardware and/or software (e.g., computing devices, execution threads and other processes). The client(s) 1402 can store location and other contextual information in disclosed embodiments.

The system 1400 also includes one or more server(s) 1404. The server(s) 1404 can also include hardware and/or software (e.g., threads, processes, computing devices). The clients 1402 and servers 1404 can execute threads to perform functions in the disclosed embodiments. For example, communication between a client 1402 and a server 1404 can be in the form of data packets adapted to be transmitted between two or more computer processes. The data packets may include contextual and other information, for example. The system 1400 includes a communication framework 1406 (e.g., a global communication network such as the Internet) that can be used for communications between the client(s) 1402 and the server(s) 1404.

Such communications may be facilitated via a wired (including optical fiber) and/or wireless technology. In embodiments, the client(s) 1402 may be operatively coupled to one or more client data store(s) 1408 that can be employed to store information local to the client(s) 1402. Likewise, the client(s) 1402 and the server(s) 1404 may be operatively connected to one or more server data store(s) 1410 that can be employed to store information local to the servers 1404, or otherwise operatively coupled to the network.

In embodiments, a computing processor may be communicatively coupled to one or more components of the food stand. The processor may automatically manage aspects of the food stand. For example, sensor(s) 1160 may be communicatively coupled to the processor, which may be remotely located in a back office as part of a back office server. In embodiments, the processor may be configured to provide food service on demand, for example, in an automated kiosk embodiment. These and other embodiments may include food management software for execution on the processor to provide for food preparation quality and control.

Figure 15:
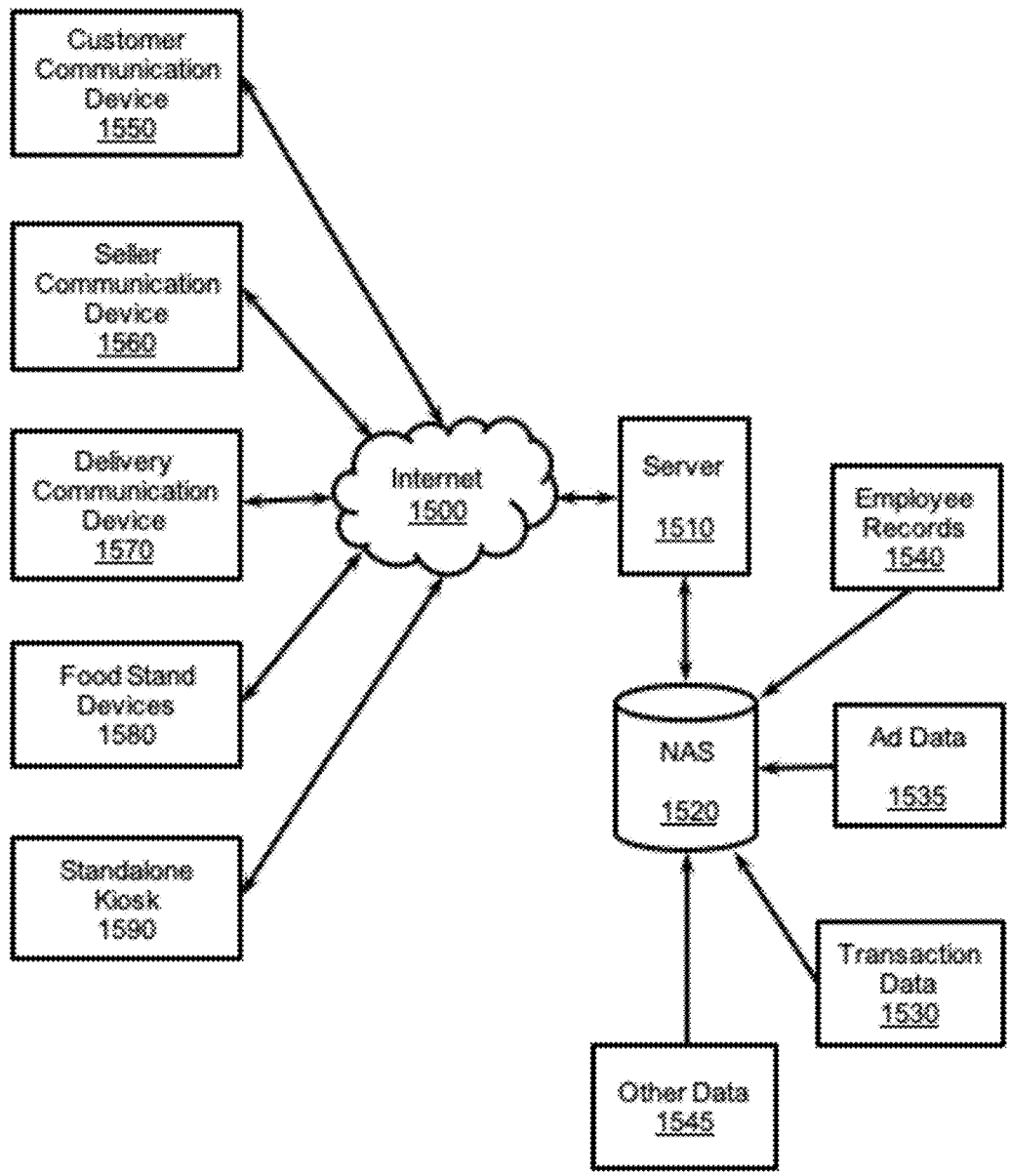
FIG. 15 depicts a block diagram of an exemplary computing environment for processing aspects of the disclosed system.

FIG. 15 is a block diagram showing aspects of food stand management system wherein devices from various parties may be communicatively coupled to a back office computing environment, for example, over a network, which may include portions or aspects of the Internet 1500. The back office computing environment may include, for example, a server 1510 operatively coupled to a network attached storage (NAS) device 1520. Data stored in the server or NAS may include transaction data 1530, advertising data 1535, employee records 1540, and other data 1545. Transaction and other data may be communicated to and from the back office server 1510 over the Internet 1500 by various parties' devices, as well as other devices, for example in connection with food stand-related transactions, operations, management, and features. That is, back office server 1510 may be configured to send and receive data carrying signals to and from one or more devices associated with a food stand, and/or devices used by parties interacting with the food stand system, and to process the data received and generate the data sent. For example, devices used by parties to a transaction can include a customer communication device 1550, a seller communication device 1560, and a delivery service communication device 1570.

Back office server 1510 may also be communicatively coupled to various devices 1580 associated with a food stand. These may include, for example, some or all of the powered components described in connection with FIG. 11. Server 1510 may execute routines, for example, to effect efficient operation and management of aspects of embodiments. Server 1510 may provide one or more of corporate access to food stand information, on site management, access to the devices of any number of food stands, inventory control, sales tracking, invoicing and receivables management, employee time card information, individual food stand menu updates including item descriptions, cost, images, and the like. Additional functionality may include food safety controls, food temperature logs, and storing data regarding food sourcing, handling, and chain of custody, such as for compliance to local, state, and federal laws and regulations; status and control of appliance temperatures. Other functionality that may be provided by the back office server may include one or more application programming interfaces, management of advertisements and promotions, and specials communicated to mobile devices of existing or potential customers proximate a food stand, and customer loyalty programs that use cards, points, or the like.

Back office server 1510 may also provide customer data analytics such as sales projections based on actual transactions, identifying popular menu items, customer spending habits, and other analyses calculated to improve customer experience. Automated notifications can also be provided based on various predetermined criteria. For example, orders for supplies can be automatically placed when the amount of particular items in inventory fall below respective predetermined thresholds. Order fulfillment can be tracked and confirmed. Suppliers can even be directed by the back office to deliver specific ordered inventory items to specific food stands. Of course, other common back office functionality related to data storage, notifications to food stand managers if out of compliance range, equipment failures, and the like; and access can also be provided relating to accounting, sales, inventory, report generation, data conversion to predetermined or select formats for export, and the like.

Exemplary embodiments can include one or more fully automated kiosks 1590. These can be operated and managed remotely from the back office. Kiosks can be managed not only to improve operational performance at individual locations, and can also be collectively managed to improve operational performance of a plurality of locations considered as a group.

Figure 16:
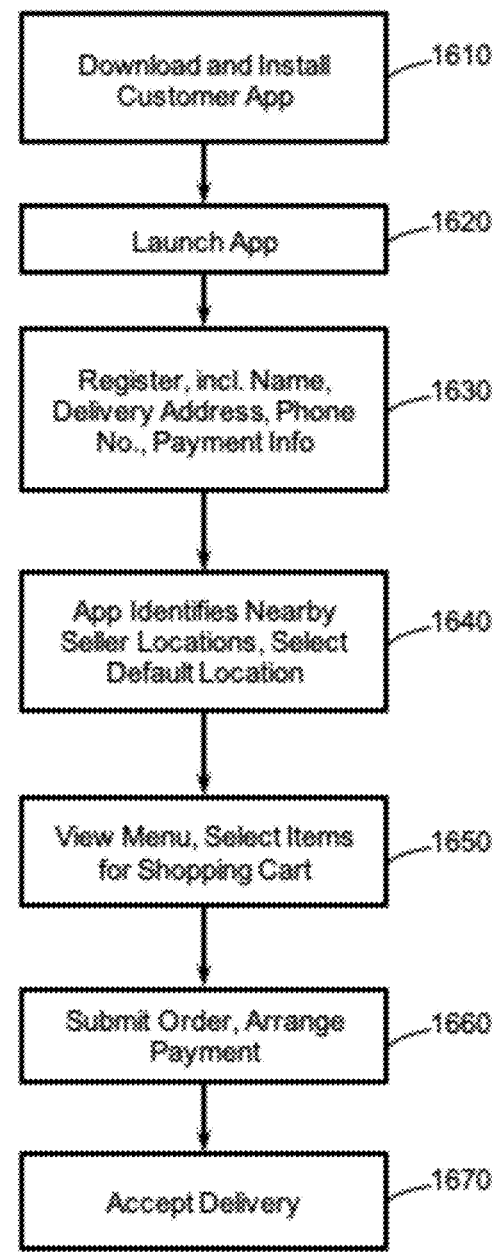
FIG. 16 depicts a flow diagram of an exemplary method for use by a customer, according to at least some embodiments disclosed herein.

FIG. 16 is a flow diagram showing a method for use with a customer device 1550 that interacts with the food stand system. The method begins with a customer downloading an customer app from an app store and installing it on the customer device, 1610. The customer app includes routines for interacting with the system. After installation, the customer app can be launched 1620. The app can be used by the customer to register with the system by creating a customer account on the back office server 1530. Registration may include the customer providing their name, delivery address, phone number, and payment information, which may be stored on server 1510 or NAS 1520. The app may be able to identify food stand locations near to the customer delivery address for selection by the customer of a default location 1640, which may also be stored with the customer information. The customer can then use the app to log in and out of the customer account and update customer-related information in the account. The customer can also use the app to view a menu of the food stand at the default location, including food item prices, information, and options 1650. The customer can select items from the menu, and hold the selections in a shopping cart. When ready, the customer can submit the selections as an order 1660, and pay for the order. In an embodiment, the customer can track the status of the order using the app until accepting delivery 1670.

Figure 17:
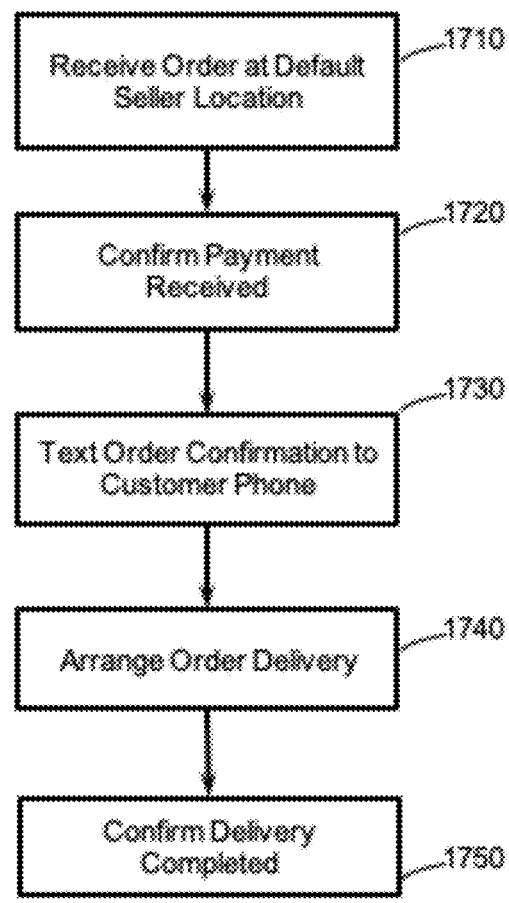
FIG. 17 depicts a flow diagram of an exemplary method for use by a seller, according to at least some embodiments disclosed herein.

Similarly, FIG. 17 is a flow diagram showing a method for use with a seller device 1560 executing a seller app to interact with the system. The seller app includes routines for creating a seller account on the server; to log in and out of the seller account, and update seller-related information in the account; to receive order information submitted by a customer; verify receipt of payment, send a confirmation message to the customer, update the order status, and send order pickup and delivery information to a delivery device running a delivery app. In particular, the exemplary illustrated method begins when the seller device at the default seller location (or other seller location selected by the customer for this order) receives an order from a customer 1710. Payment for the order is confirmed 1720, and an order confirmation may be texted to the customer's smartphone if applicable 1730. The seller then prepares the order, and arranges order delivery 1740. The seller can receive a confirmation message when delivery is completed 1750.

Figure 18:
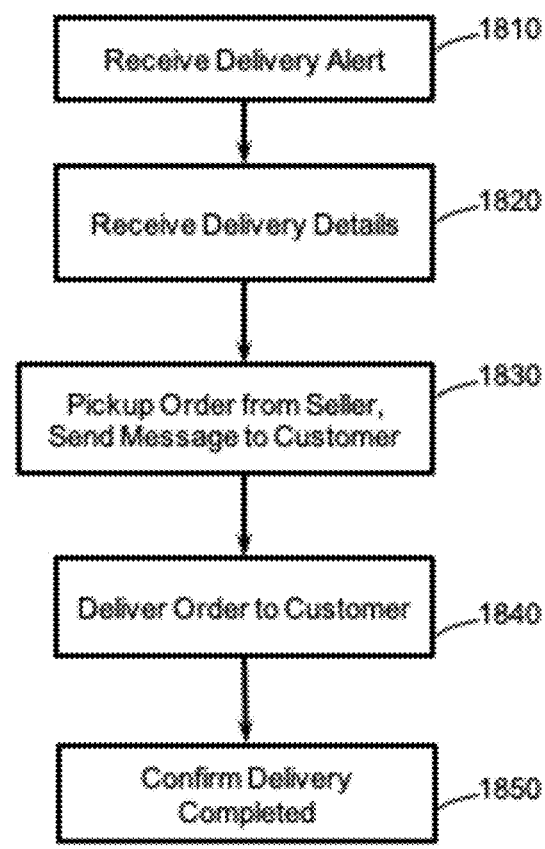
FIG. 18 depicts a flow diagram of an exemplary method for use by a deliverer, according to at least some embodiments disclosed herein.

FIG. 18 is a flow diagram showing a method for use with a deliverer device 1570 executing a deliverer app to interact with the system. The deliverer app includes routines for creating a deliverer account on the server; to log in and out of the deliverer account, and update deliverer-related information in the account; to receive order delivery information submitted by a seller including an order pickup location, a delivery location map, and an order delivery address and phone number; to confirm the order recipient; to send a delivery completed message to the order recipient; and to log an amount of time between order pickup and delivery; to send a pickup confirmation message to the customer, update the delivery status, and send delivery-related messages. In particular, the exemplary illustrated method begins when the deliverer device 1570 receives a delivery alert 1810 from the seller that an order must be delivered. The deliverer device also receives delivery details 1820. When the order is ready, it is picked up from the seller and an update message is sent to the customer 1830. The order is delivered to the customer 1840, and a message confirming delivery can be sent to at least one of the customer and the seller 1850.

As noted, the back-office server is configured to execute routines for accessing all customer-, seller-, and deliverer-input information; to manage a food preparation site including managing inventory, sales information, receivables, and employee time card info. The software may also include routines for updating menu information such as food descriptions, cost, photo, and the like; to manage food stand-related advertisements; to send special offers to mobile devices; to manage promotions such as loyalty cards and points for purchases; to provide food safety logs and equipment status logs, to change temperatures and settings remotely through Wi-Fi or cloud; and to provide analytics, including sales projections, actual sales, popular items, customer spending habits, and recommendations to improve customer experience. Other functions may include supplier notification of inventory low; order fulfillment; notifications to suppliers; storing data including accounting, sales, and inventory data; generate reports; and to download data to authorized users in predetermined formats.

A challenge addressed by disclosed embodiments and aspects include providing an appliance for easy and efficient preparation of food. As noted, the appliance can be controlled and programmed either locally or remotely. Because it includes both a source of heat and a source of refrigeration, it is capable of handling all temperature cycles from frozen to cooked and ready-to-eat. In embodiments, the appliance is also easy to load with frozen foods, cooks the food, and keeps it warm until it's time to eat. In embodiments, inventory can be stocked, locked, and accessed by access code permission. In embodiments, access may be provided to customers via a vending application that communicates with the appliance 160.

In an embodiment, one aspect of the appliance 160 may be realized as a sous vide oven appliance (not shown), preferably disposed undercounter in a food stand, or on a wall in a vending application such as hotel lobbies, convenience stores, or offices. In embodiments, the appliance 160 may comprise one or more compartments such as drawers. Each compartment may have abilities independent of the others, including at least a refrigeration component capable of freezing and cooling functions, and a heating component capable of high temperature baking and lower temperature warming. The heating may be provided with or without convection, and with or without humidity functions. Venting may be provided from each drawer through a one way valve. If a plurality of vents are provided, all can terminate in the same vent pipe. In embodiments, an electronic module is provided for controlling all functions. The module can be configured to control a single drawer, or a plurality of drawers. Controlled and/or programmable functions can include freezing, thawing, cooling, baking, and warming; humidity, temperature, date, time, function start and/or stop time(s), function duration, sequences of functions, and storing function sequences as programs. The electronic module may be programmable for all functions, defined independently, and controllable locally or remotely via a control panel coupled to the appliance, or via a PC, Tablet, Smartphone, etc., or as part of the so-called Internet of things (IoT), with a wired or wireless interface.

In embodiments, a prepared food packaging pan may have a barcode reader or the like that identifies packaged food item(s) for preparation in the appliance. The barcode may be used, for example, to define a programming regimen for proper preparation of a barcode-identified prepackaged food container. The identity of such prepackaged food containers that have been prepared using the appliance can be recorded and saved for inventory tracking, and for automatically reordering/replenishing prepackaged food supplies.

In embodiments, each compartment may include safety features such as over/under temperature limit, smoke detection and mitigation, $CO/CO_2$ concentration detection and mitigation, automatic water fill/drain, electrical supply over/under voltage, ground fault detection/interruption, etc. The appliance is constructed using any suitable durable materials and insulation to withstand temperature extremes from deep freezing to baking and self-cleaning.

Each compartment may be accessible via a swing out door or a pullout drawer. The appliance may be configured to have a select number of compartments or chambers. The chambers may have the same or different dimensions. In embodiments, the appliance can be configured to be placed on a countertop or shelf, or in a cabinet or other compartment, or it can be configured for under counter or cabinet installation, or in-wall installation. In embodiments, a plurality of chambers may be stackable and/or reconfigurable.

Typical kitchen appliances include a freezer, a refrigerator, a warner, a humidifier, an oven, and/or a steamer, among others. These devices are irregularly shaped and not easily stackable. To remedy this deficiency, FIG. 23-FIG. 28 depict an all-in-one appliance 2000 of the present invention. In general, the all-in-one appliance 2000 may comprise numerous components, such as a freezer component, a refrigerator component, a warmer component, a humidifier component, an oven component, a steamer component, a holding component, and a serving component that are independently programmable by a controller component via IoT, artificial intelligence (AI), local means, and/or remote means. In some applications, the vapor-compression refrigeration system alternatively can be replaced with a Solid-State thermoelectric (Peltier) cooling system. Moreover, it should be appreciated that the all-in-one appliance 2000 may be used with or affixed to the food stand 100.

As alluded to, the all-in-one appliance 2000 is configured as an interlocking unit or a box that is capable of handling all temperature cycles from a frozen temperature cycle to a ready-to-eat temperature cycle. The temperature cycles may be locally or remotely controlled. As an illustrative example, prepared foods may be loaded into the hollow interior of the all-in-one appliance 2000. On a pre-defined time or command, a sequence of temperatures may be executed from a cold temperature to a hot temperature. In such example, a frozen food may be defrosted and cooked. Moreover, the all-in-one appliance 2000 may hold or withstand a specific temperature until the food located in the hollow interior of the all-in-one appliance 2000 is ready for consumption.

As depicted, the all-in-one appliance 2000 may be rectangular or substantially rectangular in shape and may have a first side disposed opposite a second side, a third side disposed opposite a fourth side, and a fifth side disposed opposite a sixth side. It should be appreciated that the shape of the all-in-one appliance 2000 is not limited to such. An interior of the all-in-one appliance 2000 may be hollow and may be configured to receive a food product therein. In some examples, the interior of the all-in-one appliance 2000 may comprise a foil liner (e.g., an aluminum inner sleeve) inserted to shield the interior walls, while allowing for quick cleaning and/or replacement. The all-in-one appliance 2000 may be made from suitable durable materials and insulation to withstand temperature extremes from freezing to baking and self-cleaning.

Figure 23:
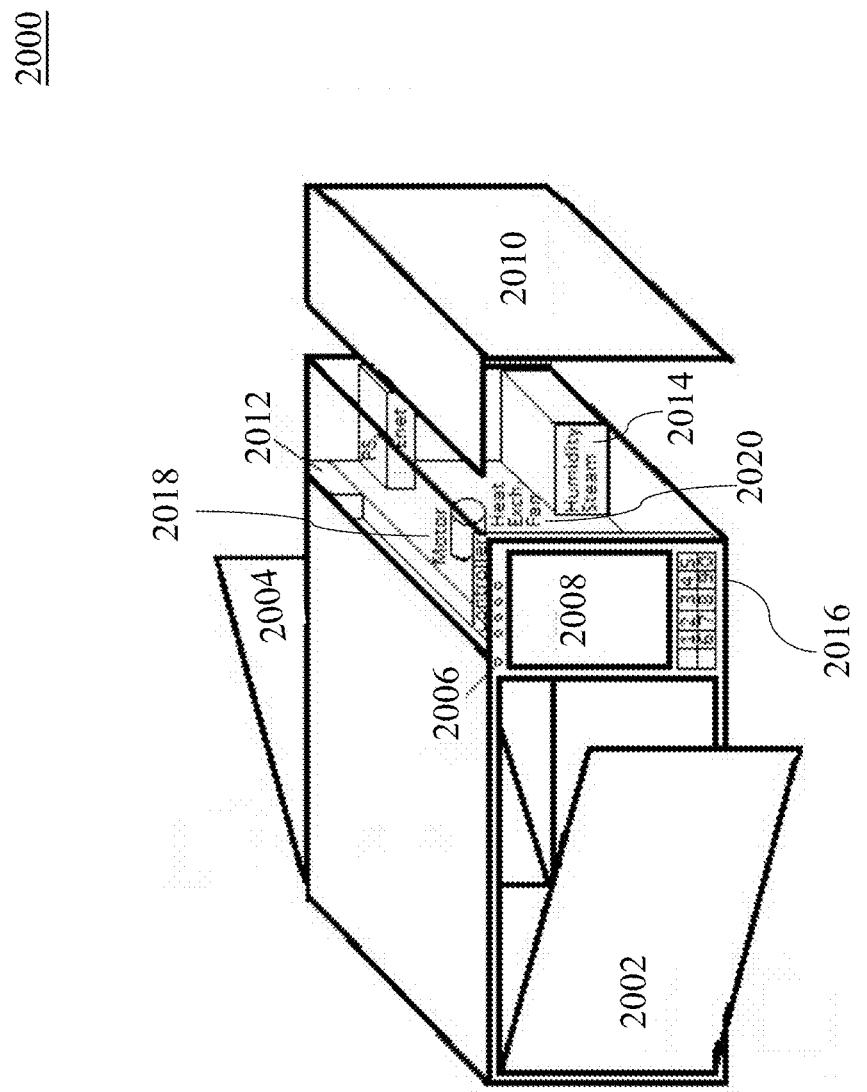
FIG. 23 depicts a schematic diagram of an all-in-one appliance having a swing-out door configuration, according to at least some embodiments disclosed herein.

The first side of the all-in-one appliance 2000 comprises a front door 2002 and the second side comprises a rear door 2004. As depicted in FIG. 23, the front door 2002 and the rear door 2004 may swing-out when opened such that the front door 2002 and the rear door 2004, when opened fully, may be perpendicular to the fifth side (or the bottom side) of the all-in-one appliance 2000 that contacts a surface. Moreover, in examples, the second side of the all-in-one appliance 2000 may comprise an interface panel, having a vent, a USB port, and/or an AC power port, as well as a port for water to enter. The fifth side (or the bottom side) of the all-in-one appliance 2000 may also comprise a drain for condensate and self-cleaning runoff.

Figure 24A:
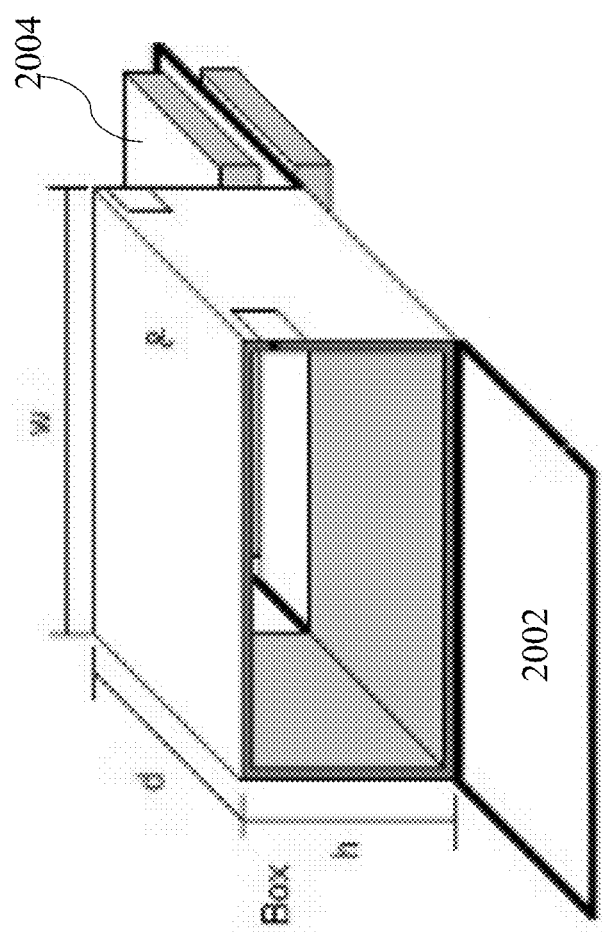
FIG. 24A depicts a schematic diagram of an all-in-one appliance having a flip-down or a flip-up door configuration, according to at least some embodiments disclosed herein.

As depicted in FIG. 24A, the front door 2002 and the rear door 2004 may flip-down or flip-up when opened. In some examples, the front door 2002 and the rear door 2004, when fully opened, may lay flush with a horizontal surface and may be perpendicular to a height of the all-in-one appliance 2000. In other examples of FIG. 24A, hinges may be used to assist in the opening of these doors. It should be appreciated that these configurations are provided for illustrative purposes only and other means to open the front door 2002 and the rear door 2004 are contemplated. Further, the rear door 2004 of FIG. 24C may comprise heating and cooling control components. In some examples, the rear door 2004 may be used for re-stocking food items into the interior of the all-in-one appliance 2000.

In some embodiments, the front door 2002 and the rear door 2004 of the all-in-one appliance 2000 may comprise locks that may be remotely controlled for customer self-service, to limit child access, and/or to limit unauthorized access, among other reasons. In additional examples, the front door 2002 and/or the rear door 2004 of the all-in-one appliance 2000 may comprise a heat seal to prevent the front door 2002 and/or the rear door 2004 from freezing to a door frame.

Moreover, as shown in FIG. 23, the first side of the all-in-one appliance 2000 may also comprise a display component 2008, a camera 2006, and/or a touchpad 2016, among other components not explicitly listed herein. The touchpad 2016 may comprise numbers and may be configured to set a time or a temperature for use of the all-in-one appliance 2000. The third side of the all-in-one appliance 2000 may comprise a service cover component 2010. The service cover component 2010 may cover numerous components of the all-in-one appliance 2000, such as a vent component 2012, a humidity stream component 2014, a motor component 2018, a heat exchange fan component 2020, among other components not explicitly listed herein.

Figure 24B:
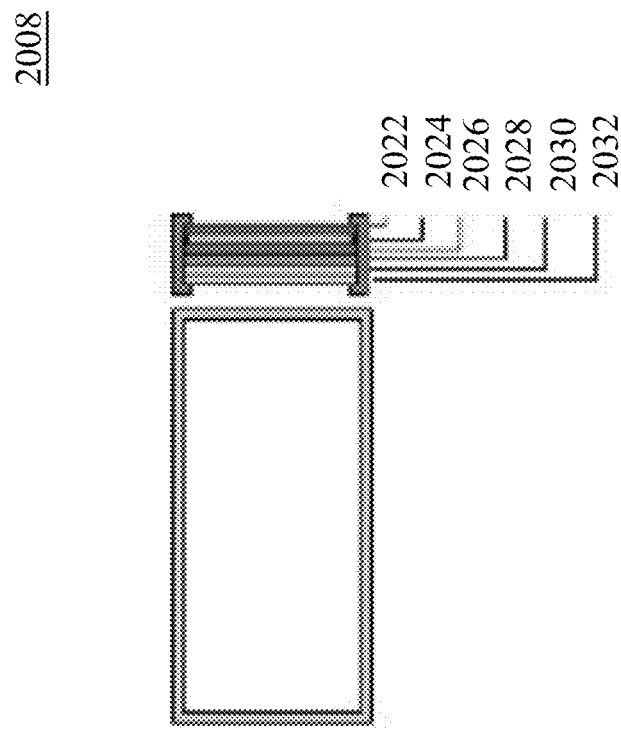
FIG. 24B depicts a schematic diagram of a front door display of an all-in-one appliance having a flip-down or a flip-up door configuration, according to at least some embodiments disclosed herein.
Figure 24C:
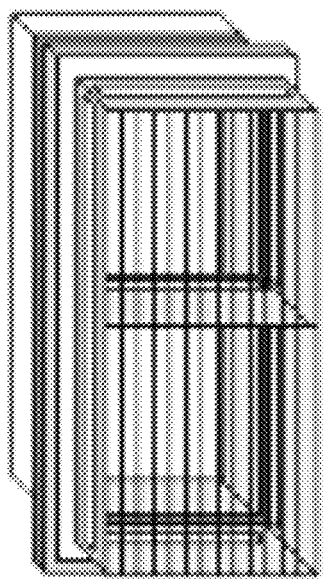
FIG. 24C depicts a schematic diagram of a rear door of an all-in-one appliance having a flip-down or a flip-up door configuration, according to at least some embodiments disclosed herein.

In some examples, and as depicted in FIG. 24B, the display component 2008 may comprise numerous layers or components, such as: a high tempered glass layer 2022, a gas layer 2024, another glass layer (e.g., an E366 glass layer) 2026, an LCD display 2028, a capacity touch screen 2030, and a tempered glass layer 2032.

Figure 25:
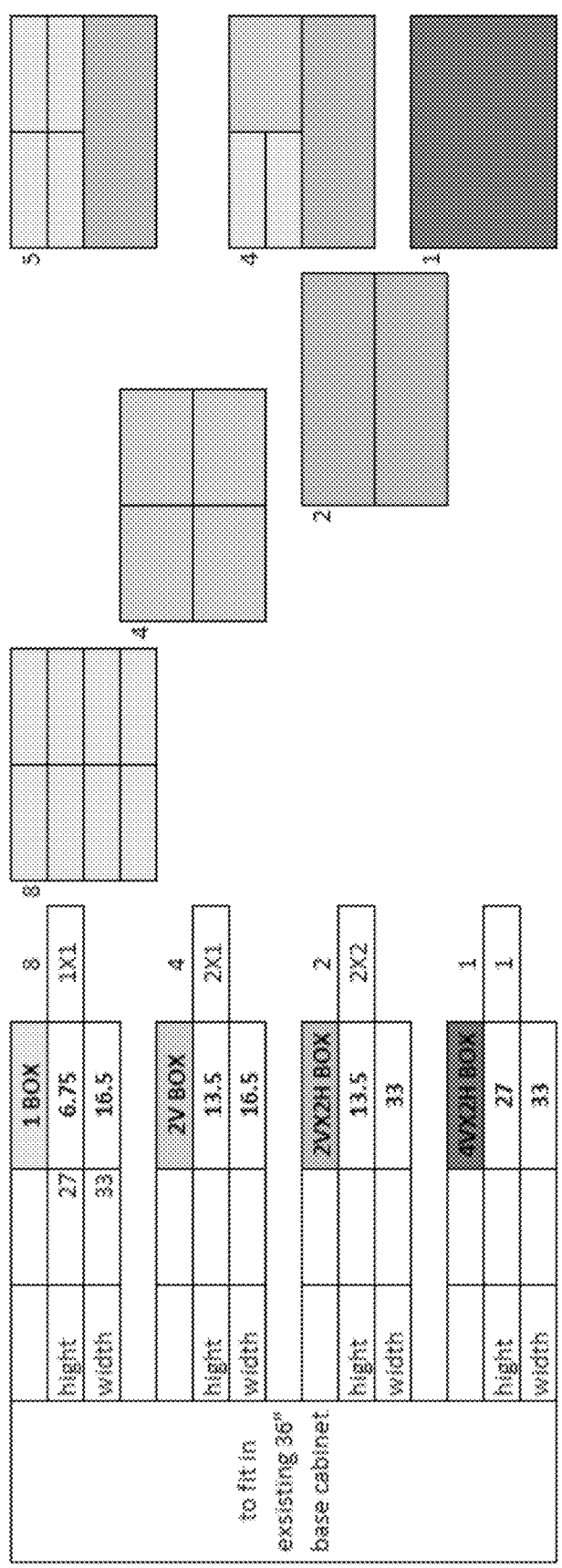
FIG. 25 and FIG. 26 depict schematic diagrams of a stacked configuration formed from stacking two or more all-in-one appliances, according to at least some embodiments disclosed herein.
Figure 26:
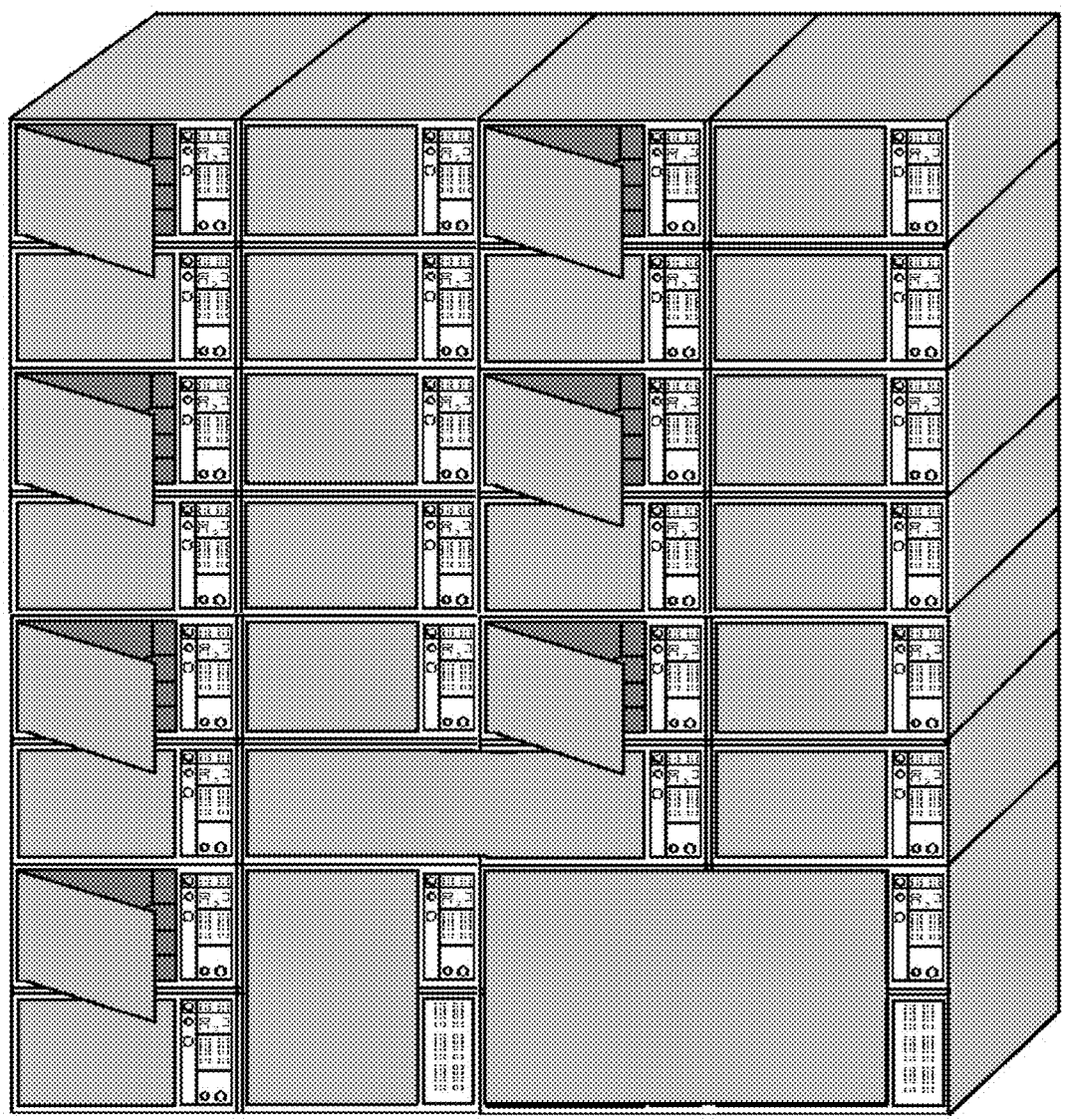
Figure 27:
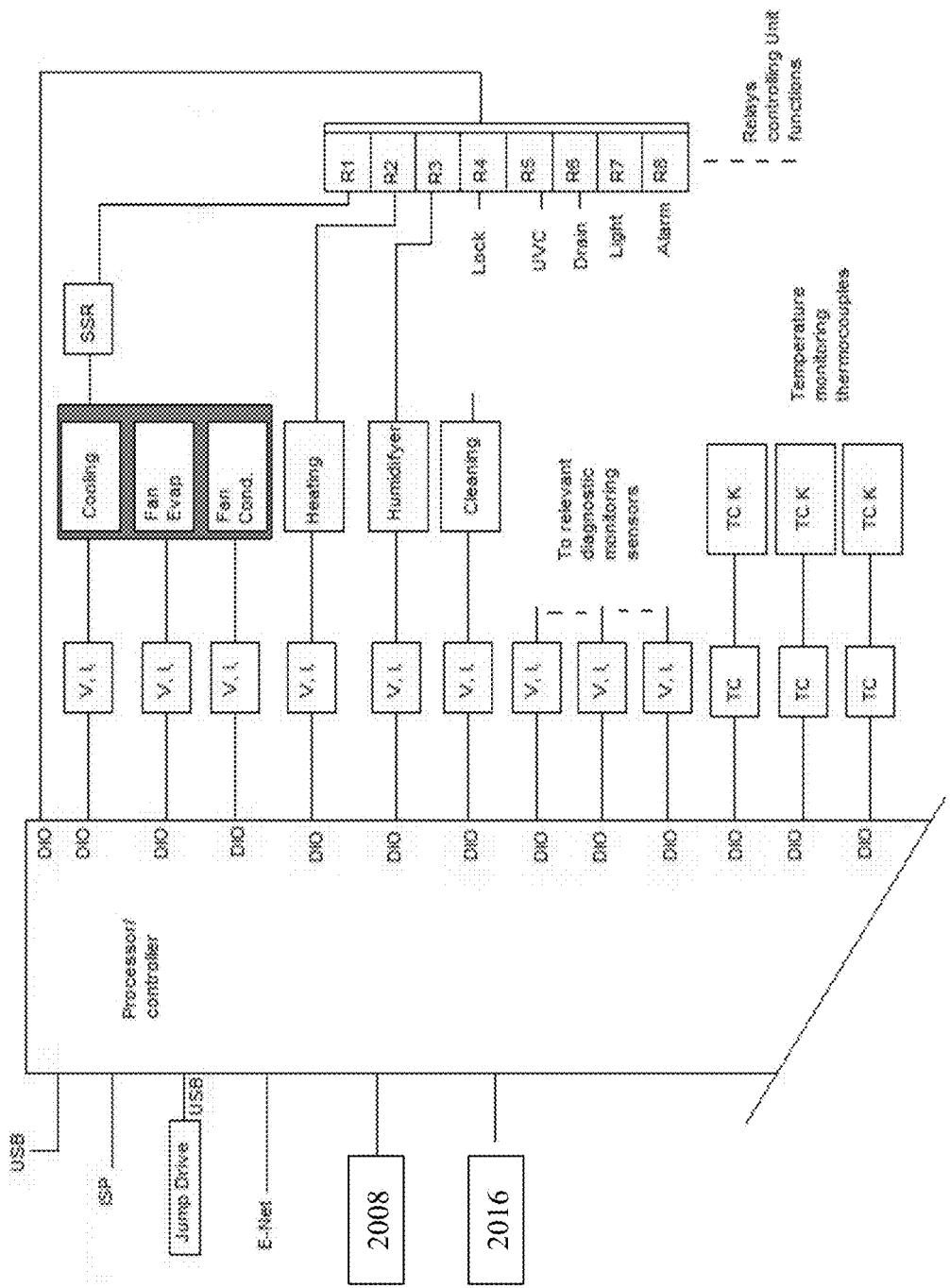
FIG. 27 depicts an electrical block diagram for an all-in-one appliance, according to at least some embodiments disclosed herein.
Figure 28:
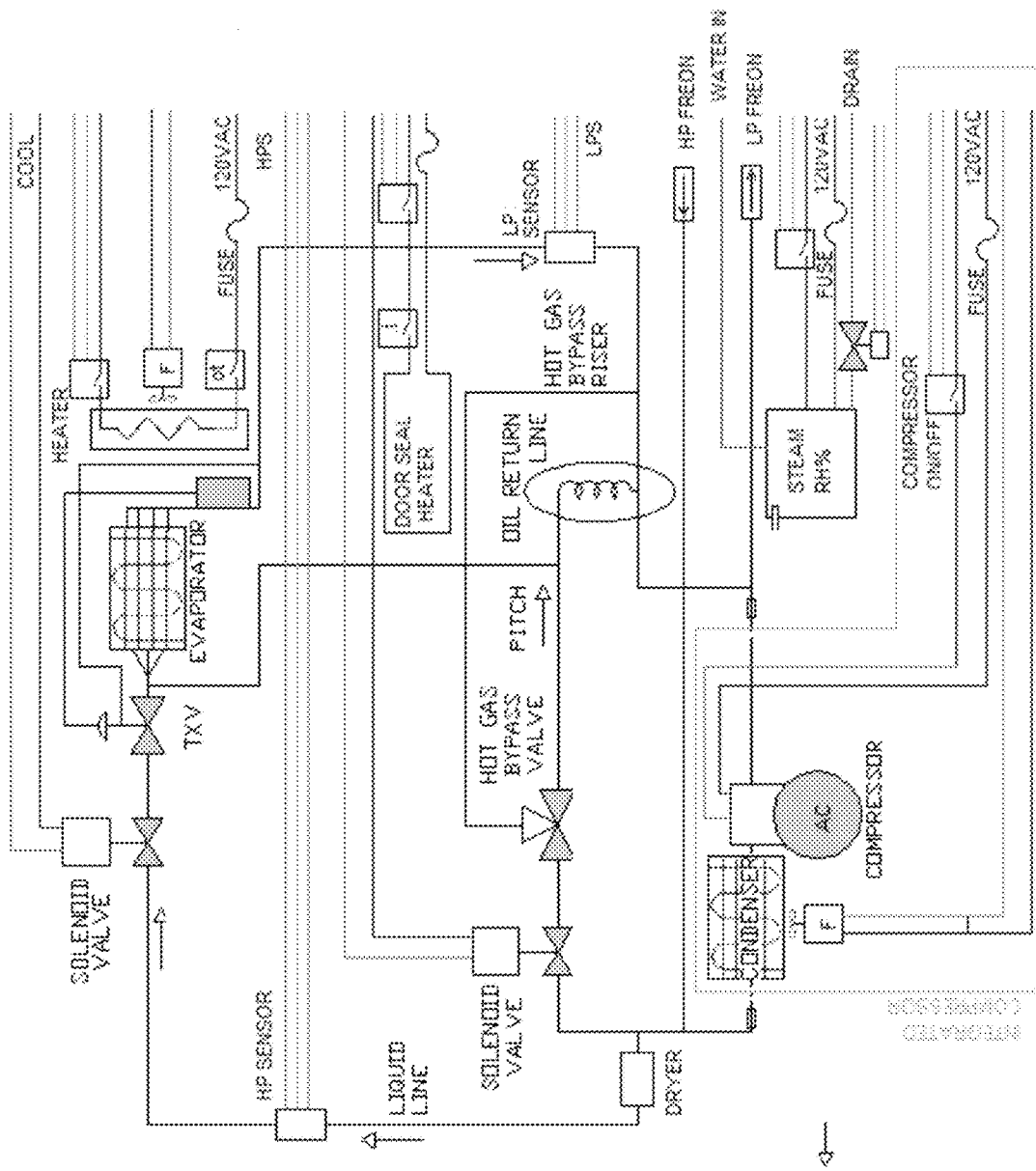
FIG. 28 depicts a schematic diagram illustrating electrical components for an all-in-one appliance, according to at least some embodiments disclosed herein.

As shown in FIG. 25, the all-in-one appliance 2000 may comprise numerous dimensions to be conveniently arranged/stacked for a defined application. One such application may be to accommodate an installation in a portion of the food stand 100. In a first example, the all-in-one appliance 2000 may be 6.75 inches in height by 16.5 inches in width. In a second example, the all-in-one appliance 2000 may be 13.5 inches in height by 16.5 inches in width. In a third example, the all-in-one appliance 2000 may be 13.5 inches in height by 33 inches in width. In a fourth example, the all-in-one appliance 2000 may be 27 inches in height by 33 inches in width. It should be appreciated that the dimension of the all-in-one appliance 2000 are being provided for illustrative purposes only and other dimensions are contemplated. The all-in-one appliance 2000 may be stackable vertically and/or horizontally to form a stacked configuration 2034. The all-in-one appliance 2000 may also be suitable for under counter installation and may be stackable to accommodate wall installations for high volume use.

Each (box/compartment) (e.g., each of the all-in-one appliance 2000) within the stacked configuration 2034 (of FIG. 26) may have independent functionality, as alluded to. For example, a refrigeration system capable of freezing and cooling food items may be independently controlled for each unit (e.g., each of the all-in-one appliance 2000). The cooling is achieved optionally (depending on use and load) using a Freon compressor sized to cool x-number of units plumbed through solenoid valves to each or using solid-state cooling (utilizing the Peltier effect) devices. It should be appreciated that when few all-in-one appliances 2000 are used, an integrated compressor 2036 (of FIG. 4D) is built into the unit itself. However, in other examples, the integrated compressor 2036 can be used to cool many all-in-one appliances 2000.

Moreover, an oven system capable of reaching warm and baking temperatures may be independently controlled for each unit (e.g., each of the all-in-one appliance 2000). The temperature may be controlled by a temperature probe (or thermocouple) connector. In some examples, the oven system may comprise a convection option and/or a humidity option.

Furthermore, a drawer of each of the all-in-one appliance 2000 in the stacked configuration 2034 may be capable of venting and may be combined to one vent pipe for the stacked configuration 2034. Moreover, the fifth side (or the bottom side) of each of the all-in-one appliance 2000 may comprise a drain for condensate and self-cleaning runoff. Drains from each of the all-in-one appliance 2000 in the stacked configuration 2034 are combined to one pipe and into a gray water line or optionally to a sewer ejector pump.

Further, each of the all-in-one appliance 2000 may comprise one or more diagnostic sensors to detect a parameter exceeding a predefined/predetermined value or falling below the predefined/predetermined value. For example, the one or more diagnostic sensors may be configured to detect: a temperature over a predefined temperature limit, the temperature below the predefined temperature limit, presence of smoke above the predetermined limit, the presence of carbon monoxide above the predetermined limit, the presence of carbon dioxide above the predetermined limit, the presence of water above the predetermined limit, and/or the presence of a pressure (e.g., water pressure, steam pressure, and/or pressure from a halocarbon product) above the predetermined limit. In examples where the presence of water is detected above the predetermined limit, the all-in-one appliance 2000 may comprise an automatic draining component configured to automatically drain the excess water.

Moreover, the all-in-one appliance 2000 may also comprise one or more components to monitor electrical components of the system (depicted in FIG. 27, and FIG. 28) and to monitor UVC sterilization of multiple components of the system. In other examples, the all-in-one appliance 2000 may also have a self-cleaning feature that is accomplished using steam and/or hot water spray.

The all-in-one appliance 2000 is user-customizable. Any temperature feature may be omitted from the all-in-one appliance 2000 for cost reduction or based on the need of the purchaser of the all-in-one appliance 2000. As a first example, the purchaser of the all-in-one appliance 2000 may merely sell ice cream and may have no need for a hot temperature feature. As such, the hot temperature features may be omitted from the all-in-one appliance 2000 for this purchaser. As a second example, the purchaser of the all-in-one appliance 2000 may merely sell salads or drinks and may have no need for a deep freeze feature. As such, the deep freeze features may be omitted from the all-in-one appliance 2000 for this purchaser.

All features and functions (e.g., temperature, date, time, duration, sequences, and/or programs, etc.) of the components of all-in-one appliance 2000 may be independently controlled by the controller component. The controller component or module may be controllable locally or remotely and wired or wirelessly using a device, such as a PC, a tablet, a smartphone, or the IoT device, among others. The controller component may also capture all data (e.g., content inventory, order/sales data, unit diagnostics, temperature, and/or sequences, etc.) and may transmit the data to the device (e.g., the smartphone) and/or a server for storage. Such stored data in the server may be accessible for monitoring purposes, self-diagnostic purposes, reporting purposes, logging purposes, and/or food safety compliance purposes.

A third-party (e.g., customer) may utilize a smartphone to view content in the all-in-one appliance 2000, to place an order for a food or drink item in the all-in-one appliance 2000, and to pay for the order of the food or drink item from the all-in-one appliance 2000. Such actions initiate the relevant temperature sequence for the food item (e.g., warm the food item). In other examples, the packaging for the food or drink item may comprise a barcode or a similar item recognition tag which is read to identify the food item. Such identification is used to execute the programming regiment for proper serving preparation. The customer may then receive a notification. Moreover, the notification may include audio, graphic, video and/or textual components. The notification may further explain when and how to pick up the food and/or drink item. In an example, the notification will identify what door of the all-in-one appliance 2000 in the stacked configuration 2034 the food or drink item will be available in, as well as instructions on how to unlock the door. The notification may be transmitted to the customer via SMS, e-mail, map, etc.

In other example, the all-in-one appliance 2000 may optionally include a speaker component and/or a microphone component that provides instructions to the customer and/or allows the customer to communicate with the system.

In an additional example, the all-in-one appliance 2000 may comprise a video camera for monitoring access to the all-in-one appliance 2000.

Diagnostics for the all-in-one appliance 2000 may be determined by monitoring the one or more diagnostic sensors and comparing data of the one or more diagnostic sensors to defined normal operating limits. Any diagnostics data anomaly is logged and may be transmitted to another device, the server, and/or a third-party service for further analysis.

In the foregoing, when introducing disclosed embodiment(s) or aspects thereof, the articles "a," "an," and "the" are intended to mean that there are one or more of the elements or aspects. Similarly, the adjective "another," when used to introduce an element, is intended to mean one or more elements. The terms "including" and "having" are intended to be inclusive such that there may be additional elements other than the listed elements.

Although the embodiments have been described with a certain degree of particularity, it is to be understood that the foregoing disclosure has been made only by way of illustration and not limitation. Numerous changes in the details of construction and arrangement of parts may be made without departing from the spirit and the scope of the invention as defined by the appended claims.

What is claimed is:
1. A food stand system comprising:
a support structure with a semicircular plan view having two ends, with a flat top surface as a countertop, a bottom, and a front surface permanently coupled therebetween defining a convex customer-facing surface and a concave server-facing surface, the space defined by the top, bottom, and front of the support structure defining a compartment, wherein the semicircular support structure is configured to be separable into two parts along a vertical plane, wherein the flat top surface is configured to be accessible by human servers positioned within an interior of the food stand system and by human customers positioned on an exterior of the food stand system, wherein no substantial vertical barrier extends above the flat top surface, which per the food stand system and its configuration enables items to be conveyed across a void above the top flat surface from the interior to the exterior without significant impediment;
a serving bar having two ends, each end removably attached to one of the two parts of the support structure, wherein the serving bar is one of a plurality of serving bars, each configured to be used for a different respective type of event;
a water system, the water system having one or more pipes configured for water flow received from a water shut-off valve to at least one or more food preparation appliance;
a vertical brace is substantially planar with a protruding portion having a first side located opposite a second side, the vertical brace is attached to each respective end forming an end surface disposed between the bottom of the support structure and the countertop, and wherein the vertical brace has one or more openings traversing from the first side of the protruding portion of the vertical brace to the second side of the protruding portion of the vertical brace, the one or more openings to receive the one or more pipes of the water system;
a radiused outer perimeter edge of the protruding portion of the vertical brace abuts and conforms to the convex customer-facing surface and is oriented perpendicular to the convex customer-facing surface;

the food preparation appliance disposed within the compartment;

a sensor coupled to the food preparation appliance, the sensor operative to measure, as sensed data, a physical characteristic of the appliance or of food prepared using the appliance;

a processor operatively coupled to the sensor and configured to process the sensed data in accordance with instructions stored in a tangible data storage device in data communication with the processor, the instructions defining a procedure using the sensed data for preparing food using the appliance; and a back office server having a transceiver operatively coupled to the processor and a server memory device, configured to send and receive data carrying a signal to and from one or more parties interacting with the system, and wherein at least a portion of the data is sensor data generated from the sensor of the food preparation appliance.

2. The system as recited in claim 1, further comprising:
a heating component and a cooling component within the food preparation appliance, arranged to apply a range of temperatures to food prepared in the appliance.

3. The system as recited in claim 1, further comprising:
a platform coupled to the bottom of the support structure;
an enclosure coupled to the platform defining a space surrounding the support structure;
a door mounted to the enclosure for entering and exiting the space;
a power source disposed inside the platform and arranged to provide power to the appliance,
wherein the power source comprises an internal power source or an external power source,
wherein the internal power source is selected from the group consisting of: a fuel cell that generates power, a battery, a solar power source, a gas power source, a diesel power source, a natural gas power source, and a propane power source, and
wherein the external power source comprises an electric utility company in a fixed location or a temporary location;
instructions stored in the data storage device defining an energy management procedure for operating the power source and the appliance;
a towable trailer removably coupled to the platform.

4. The system as recited in claim 1, further comprising a portable kitchen having:
a cooking surface;
a sink with running water;
a refrigerator;
the food preparation appliance; and
instructions stored in the storage device which, when executed by the processor, manage the kitchen to provide food service on demand and/or comprise food management software for food quality and control.

5. The system as recited in claim 1, wherein the server memory device stores instructions for generating data sent and processing data received, and the processor is configured to generate data sent and process data received.

6. The system as recited in claim 5, wherein the signals include data received from a customer device running a customer app that interacts with the system, the customer app including routines for:
creating a customer account on a communicatively coupled server;
logging in and logging out of the customer account;
updating customer-related information in the customer account;
presenting a menu including food item prices, information, and options;
presenting a food stand locator map and a food stand selector;
providing interfaces for:
a shopping cart for holding food item selections;
order payment;
order status tracking;
order delivery tracking; and
receiving order completion confirmation from seller.

7. The system as recited in claim 5, wherein the signals include data received from a seller device running a seller app that interacts with the system, the seller app including routines for:
creating a seller account on the communicatively coupled server;
logging in and logging out of the seller account;
updating seller-related information in the seller account;
receiving order information submitted by a customer;
verifying receipt of payment for the order;
sending a confirmation message to the customer;
updating order status;
sending order pickup and delivery information to a delivery device.

8. The system as recited in claim 5, wherein the signals include data received from a delivery device running a delivery app that interacts with the system, the delivery app including routines for:
creating a deliverer account on the communicatively coupled server;
logging in and logging out of the deliverer account;
updating deliverer-related information in the deliverer account;
receiving order delivery information including an order pickup location, a delivery location map, and an order delivery address and phone number;
confirming the order recipient;
sending a delivery completed message to the order recipient; and
logging an amount of time between order pickup and delivery.

9. The system as recited in claim 1, further comprising:
a hand washing station affixed to the food stand system via a slide-in/slide-out attachment mechanism.

10. The system of claim 1, further comprising:
a door of the compartment with a locking mechanism, the locking mechanism is in electrical communication with a payment verification application configured to be accessible to a user, via interface of an electronic device.

* * * * *